Dec. 8, 1964 M. T. LUDVIGSON ETAL 3,160,833

AUTOMATIC COUPLING NETWORK FOR MATCHING THE IMPEDANCE OF AN ANTENNA TO A PLURALITY OF LINES OPERATING AT DIFFERENT FREQUENCIES

Filed June 1, 1962 10 Sheets-Sheet 1

INVENTORS
LONEY R. DUNCAN JR.
MERRILL T. LUDVIGSON
VIRGIL L. NEWHOUSE
BY Moody and Harris
ATTORNEYS AUTOMATIC COUPLING NETWORK FOR MATCHING THE IMPEDANCE OF AN ANTENNA TO A PLURALITY OF LINES OPERATING AT DIFFERENT FREQUENCIES Filed June 1, 1962

INVENTORS
LONEY R. DUNCAN JR.
MERRILL T. LUDVIGSON
VIRGIL L. NEWHOUSE
BY Moody and Harris
ATTORNEYS AUTOMATIC COUPLING NETWORK FOR MATCHING THE IMPEDANCE OF AN ANTENNA TO A PLURALITY OF LINES OPERATING AT DIFFERENT FREQUENCIES Filed June 1, 1962 10 Sheets-Sheet 3

INVENTORS
LONEY R. DUNCAN JR.
MERRILL T. LUDVIGSON
VIRGIL L. NEWHOUSE
BY Moody and Harris
ATTORNEYS Dec. 8, 1964 M. T. LUDVIGSON ETAL 3,160,833

AUTOMATIC COUPLING NETWORK FOR MATCHING THE IMPEDANCE OF AN ANTENNA TO A PLURALITY OF LINES OPERATING AT DIFFERENT FREQUENCIES

Filed June 1, 1962 10 Sheets-Sheet 4

INVENTORS
LONEY R. DUNCAN JR.
MERRILL T. LUDVIGSON
VIRGIL L. NEWHOUSE
BY Moody and Harris
ATTORNEYS AUTOMATIC COUPLING NETWORK FOR MATCHING THE IMPEDANCE OF AN ANTENNA TO A PLURALITY OF LINES OPERATING AT DIFFERENT FREQUENCIES Filed June 1, 1962 10 Sheets-Sheet 5

INVENTORS
LONEY R. DUNCAN JR.
MERRILL T. LUDVIGSON
VIRGIL L. NEWHOUSE
BY Moody and Harris
ATTORNEYS INVENTORS
LONEY R. DUNCAN JR.
MERRILL T. LUDVIGSON
VIRGIL L. NEWHOUSE
BY Moody and Harris
ATTORNEYS AUTOMATIC COUPLING NETWORK FOR MATCHING THE IMPEDANCE OF AN ANTENNA TO A PLURALITY OF LINES OPERATING AT DIFFERENT FREQUENCIES Filed June 1, 1962 10 Sheets-Sheet 7

INVENTORS
LONEY R. DUNCAN JR.
MERRILL T. LUDVIGSON
VIRGIL L. NEWHOUSE
BY Moody and Harris
ATTORNEYS INVENTORS
LONEY R. DUNCAN JR.
MERRILL T. LUDVIGSON
VIRGIL L. NEWHOUSE
BY Moody and Harris
ATTORNEYS Dec. 8, 1964 M. T. LUDVIGSON ETAL 3,160,833

AUTOMATIC COUPLING NETWORK FOR MATCHING THE IMPEDANCE OF AN ANTENNA TO A PLURALITY OF LINES OPERATING AT DIFFERENT FREQUENCIES

Filed June 1, 1962 10 Sheets-Sheet 9

INVENTORS
LONEY R. DUNCAN JR.
MERRILL T. LUDVIGSON
VIRGIL L. NEWHOUSE
BY Moody and Harris
ATTORNEYS INVENTORS
LONEY R. DUNCAN JR.
MERRILL T. LUDVIGSON
VIRGIL L. NEWHOUSE
BY Moody and Harris
ATTORNEYS United States Patent Office 3,160,833

Patented Dec. 8, 1964

3,160,833

AUTOMATIC COUPLING NETWORK FOR MATCHING THE IMPEDANCE OF AN ANTENNA TO A PLURALITY OF LINES OPERATING AT DIFFERENT FREQUENCIES

Merrill T. Ludvigson, Cedar Rapids, and Virgil L. Newhouse and Loney R. Duncan, Jr., Marion, Iowa, assignors to Collins Radio Company, Cedar Rapids, Iowa, a corporation of Iowa Filed June 1, 1962, Ser. No. 200,029

10 Claims. (Cl. 333—17)

This invention relates to a multicoupler impedance matching network and more particularly to a network for sequentially and automatically matching the impedance of an antenna to that of an input line whereby a plurality of transmitting and receiving units may be utilized with a single common antenna.

For most efficient power transfer between an input line and an output line, the latter of which may be connected to an antenna and the former of which may be connected to a transmitter or a receiver, it is necessary that the impedance therebetween be correctly matched. Such a match is commonly made by careful selection of reactance elements in the circuit coupling the input line to the output line. While obtaining a correct impedance match might be fairly simple where the impedance match need only be for a single or very narrow band of frequencies, for example, the task becomes quite difficult when the impedances are to be matched over a wide range of frequencies.

In addition, if a common antenna is to be utilized for a plurality of transmitters and receivers, the coupling circuit itself must be such as to avoid back impedance holes caused by unpredictable input circuit loading, provide high bilateral selectivity to avoid unwanted frequencies and yet maintain resonable efficiency to maximize power transfer at the operating frequency. This, in turn, creates a need for an impedance matching network that is capable of tuning the coupling circuit in a manner such as to realize this desired end.

While impedance matching networks have been known and utilized heretofore, such as, for example, the impedance matching networks of United States Patent No 2,921,273, issued to Samuel L. Broadhead, Jr. and Merrill T. Ludvigson, and United States patent application, Serial No. 161,598, entitled "Coupling and Impedance Matching Network," filed December 22, 1961, by Bernard J. Beitman, Jr., Loney R. Duncan, Jr., Merrill T. Ludvigson and Donald R. Stevens, and assigned to the assignee of the present invention, no prior network has been developed whereby a coupling circuit may be automatically tuned to achieve a proper impedance match in such a manner as to constantly provide high back impedance off resonant frequencies and high selectivity at a chosen frequency whereby a common antenna may be safely and effectively utilized with a plurality of transmitters and receivers.

It is therefore an object of this invention to provide a multicoupler impedance matching network capable of quickly and efficiently automatically tuning a coupling circuit to maximize power transfer between the input and output thereto.

It is another object of this invention to provide a multicoupler impedance matching network capable of automatically and sequentially tuning a coupling circuit to have high selectivity whereby intermodulation spurious frequencies are suppressed both in generation and radiation.

It is also on object of this invention to provide a multicoupler impedance matching network capable of automatically and sequentially tuning a coupling circuit to avoid back impedance holes and thereby enable a plurality of transmitters and receivers to be connected to a single common antenna.

It is another object of this invention to provide a novel multicoupler impedance matching device having means for causing a coupling circuit to assume a preselected homing position, for then adjusting a series circuit to resonance at a preselected frequency, for then adjusting elements of a double tuned tank circuit to resonance at said preselected frequency, and finally adjusting series and shunt reactive elements in said coupling circuit to match the output impedance to the input impedance whereby power transfer is maximized at said preselected frequency and high back impedance and attenuation is exhibited off said preselected frequency.

It is another object of this invention to provide a novel method for tuning a multicoupler whereby the impedance of an antenna is matched to that of an input line without back impedance holes occurring during the tuning cycle.

It is still another object of this invention to provide a novel coupling circuit capable of matching the impedance of an antenna to that of an input line in such a manner that high selectivity and high back impedance off resonant frequency is continuously maintained.

It is yet another object of this invention to provide a novel coupling circuit capable of matching the impedance of an antenna to that of an input line whereby a plurality of transmitters and receivers may be connected through a like plurality of coupling circuits so that the effective antenna impedance is automatically and continuously matched to that of the connected transmitter or receiver regardless of any changes in the number of transmitters and receivers so connected to said common antenna.

With these and other objects in view which will become apparent to one skilled in the art as the description proceeds, this invention resides in the novel cconstruction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
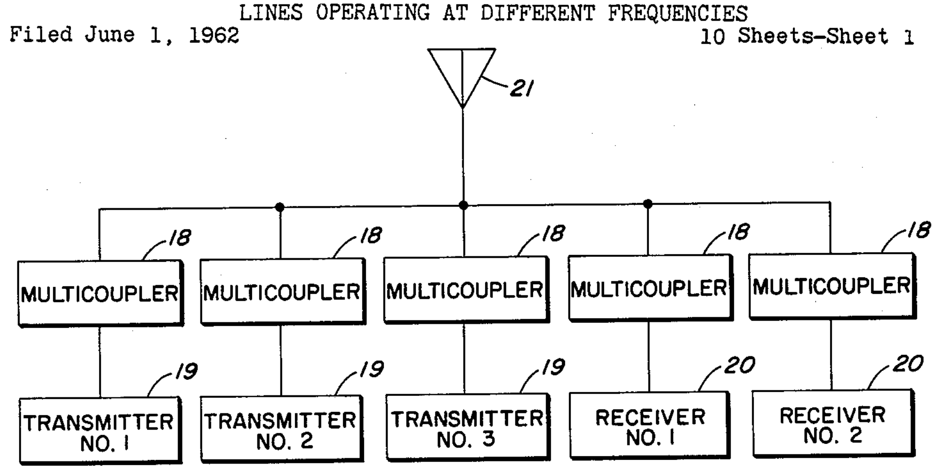
FIGURE 1 is a block diagram illustrating the use of a plurality of the multicouplers of this invention to connect a like plurality of receivers and transmitters to a single common antenna.

Referring now to the drawings in which like numerals have been used for like characters throughout, the numeral 18 refers to the multicoupler in general, which multicoupler, as shown in FIGURE 1, may be utilized either between a transmitter 19 or a receiver 20 and an antenna 21 to match the impedance therebetween as well as avoiding back impedance holes and providing high selectivity to thereby make it feasible to connect a plurality of transmitters 19 and receivers 20 to a single common antenna 21.

Figure 2:
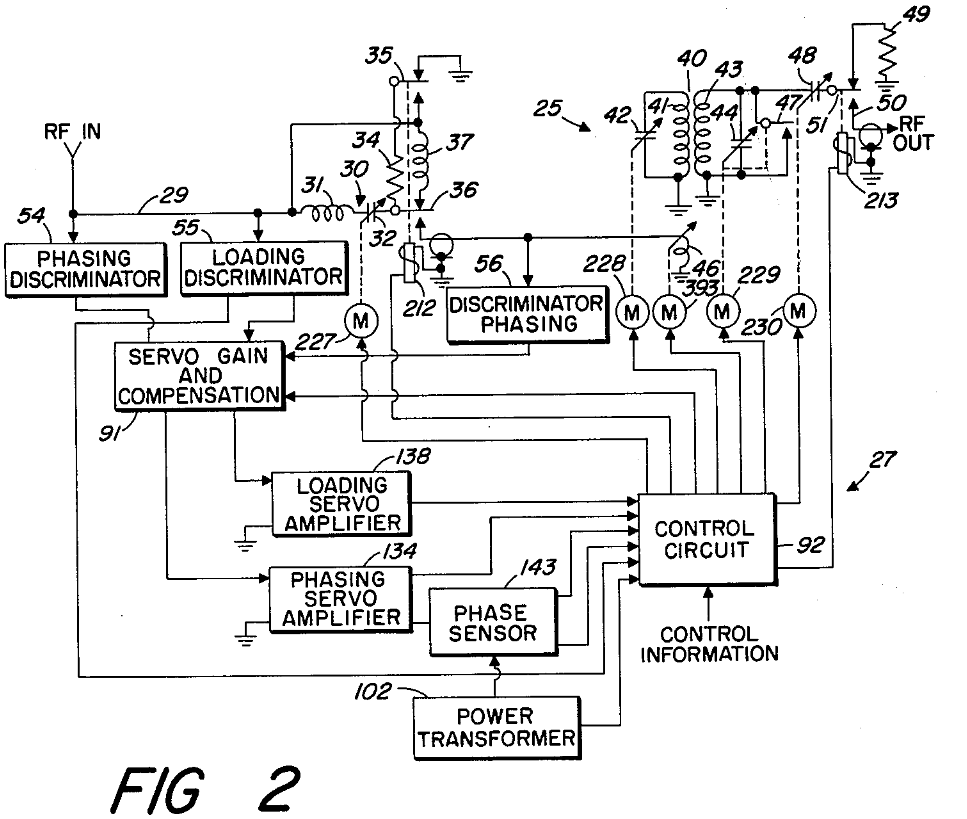
FIGURE 2 is a partial schematic diagram illustrating the multicoupler of this invention.

As shown in FIGURE 2, the coupling circuit 25 of each multicoupler 18 is tuned to match the output impedance (of an antenna) to that of the input impedance (of a transmitter or a receiver) by means of control system 27 associated therewith. A portion of coupling circuit 25 (the tunable series trap) is shown, described and claimed in copending United States patent application, Serial Number 200,031, entitled "Multicoupler System Utilizing Tunable Traps" filed June 1, 1962, by Merrill T. Ludvigson, Loney R. Duncan, Jr., and Thomas R. Cuthbert, and assigned to the assignee of the present invention.

As shown in FIGURE 2, coupling circuit 25 includes and input line 29 and a tunable series trap 30, the latter of which is intended primarily for eliminating back impedance holes.

Series trap 30 includes an inductor 31 and a variable capacitor 32. If desired, inductor 31 may be center tapped for use at high frequencies. In addition, a resistor 34 is connected in parallel with series trap 30 by switch 35 when the trap is connected to the remainder of the coupling circuit, and is connected in series with the trap to ground by switch 35 whenever the trap is disconnected from the remainder of the coupling circuit by switch 36. Resistor 34 provides a predictable load off resonance when in parallel with series trap 30, and the series trap then effectively shorts out resistor 34 to prevent power losses at the selected operating frequency. Also a tuning aid choke 37 is connected in parallel with series trap 30, as shown in FIGURE 2, when the trap is disconnected from the remainder of the coupling circuit.

A double-tuned tank circuit 40, having an input tuned circuit comprising an inductor 41 and a parallel connected variable capacitor 42 and an output tuned circuit comprising an inductor 43 and a variable capacitor 44, also forms a portion of the coupling circuit. Capacitor 42 is made variable since the input tuned circuit must be carefully tuned to obtain the desired degree of selectivity. A link coupled input is provided to the input tuned circuit by means of inductor 46. This link coupling is adjustable since the coefficient of coupling therebetween determines the load Q of the double tuned tank circuit.

Capacitor 44 in the output tuned circuit of double-tuned tank circuit 40 not only serves to resonate the output tuned circuit but, in addition, also serves as the shunt capacitor varied to reduce phasing error to zero during the tuning sequence. Since the input tuned circuit must be carefully tuned, a switch 47 is provided to short out capacitor 44 when at its maximum position (which is the position of capacitor 44 during the tuning sequence until it is tuned near the end of said sequence). This assures against any reflected impedance at the input tuned circuit while this circuit is being tuned.

Loading error is reduced to zero during the tuning sequence by means of series connected variable capacitor 48. As shown in FIGURE 2, the output from the output tuned circuit is top coupled to capacitor 48, which capacitor is then either connected to a dummy load resistor 49 or the output line 50 (which may, in turn, be connected to antenna 21) by means of switch 51.

Load resistor 49, which may have a value of 50 ohms, for example, has two purposes. First, by switching to this load during tuning, it prevents other circuits connected to the common output line from seeing a ground and being shorted thereby. Second, when a receiver is to be used with the multicoupler, the dummy load may be used for the entire tuning sequence and further tuning is unnecessary after the antenna is again connected to the coupler.

The control system of the multicoupler of this invention includes a phasing discriminator 54 and a loading discriminator 55, both of which are responsive to the R.F. signal present at input line 29, as well as a second phasing discriminator 56, which discriminator senses the R.F. signal between the series trap 30 and double-tuned tank circuit 40. These discriminators may be conventional and may, for example, be as shown in FIGURES 12 and 13.

Figure 12:
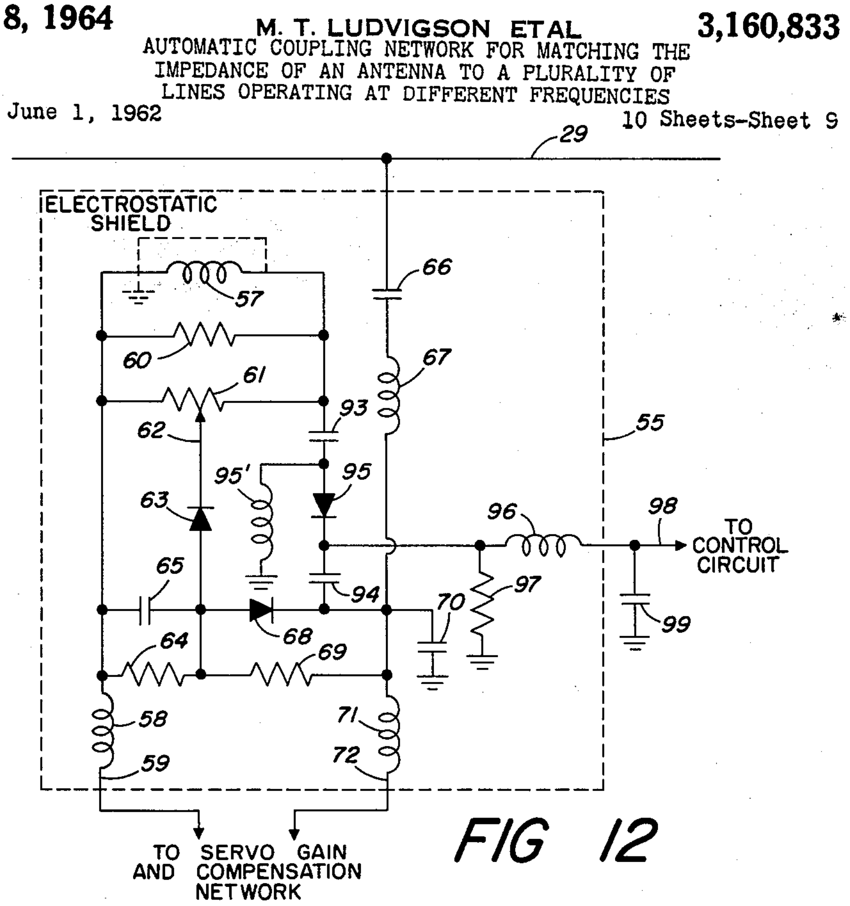
FIGURE 12 is a schematic diagram illustrating the loading discriminator of FIGURE 2.
Figure 13:
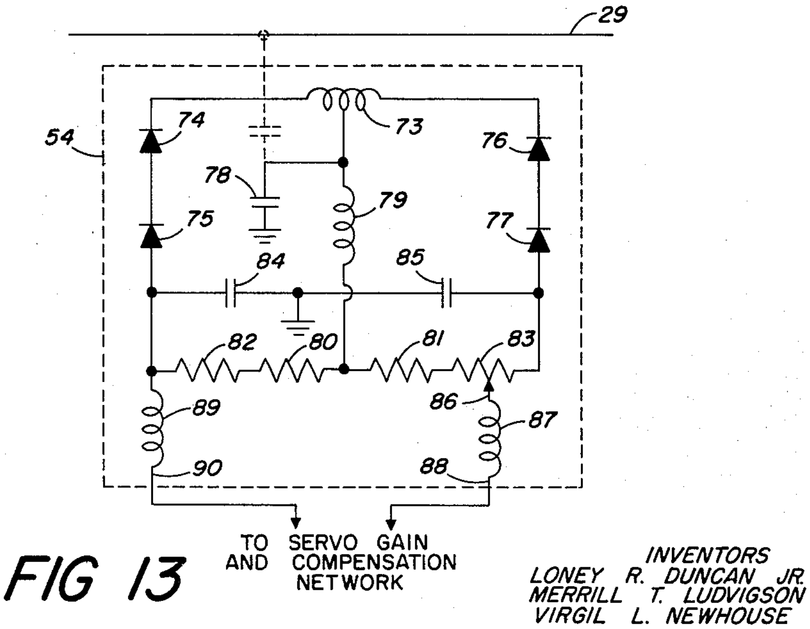
FIGURE 13 is a schematic diagram illustrating the phasing discriminators of FIGURE 2.
Figure 14:
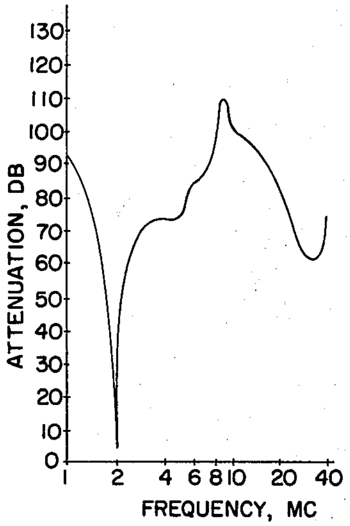
FIGURES 14 through 17 are graphical presentations illustrating the high selectivity tuning achieved by the multicoupler of this invention at various selected frequencies.
Figure 15:
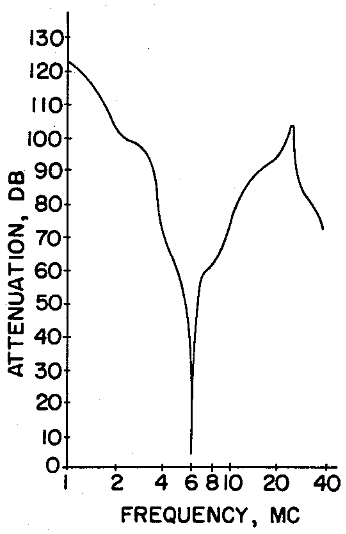
Figure 16:
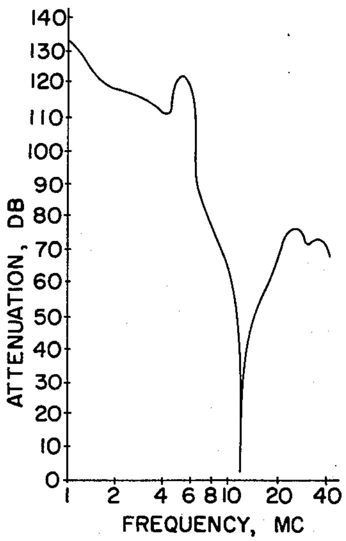
Figure 17:
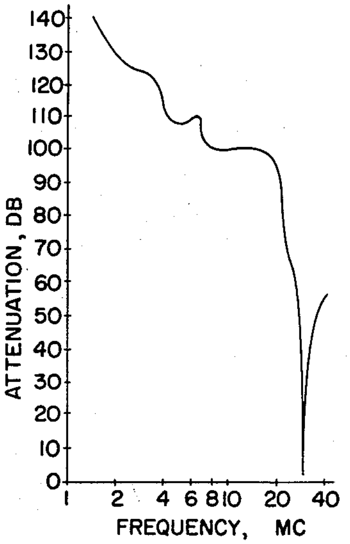

As shown in FIGURE 12, loading discriminator 55 may be transformer coupled from input transmission line 29 (which serves as the primary) by means of inductor 57 (which serves as the transformer secondary). Inductor 57 is connected at one side through choke 58 to output lead 59 and has loading resistors 60 and 61 connected in parallel therewith, the latter having a variable tap 62 for adjusting the magnitude of the signal coupled from the input line by transformer action. Resistors 60 and 61 are chosen so that the voltage developed across coil 57 is in phase with the transmission line current.

Variable tap 62 of resistor 61 is connected to rectifier 63, which in turn, is connected to one side of resistor 64. The other side of resistor 64 is connected to coil 58. In addition, a bypass capacitor 65 may be connected in parallel with resistor 64. Thus, the voltage developed across coil 57 is rectified by diode 63 so that a D.C. voltage is developed across resistor 64 that is proportional to the current of input line 29.

A second signal is taken from input transmission line 29 through serially connected capacitor 66 and coil 67 to diode 68 where the input signal is rectified to produce a D.C. voltage across resistor 69 (connected in parallel with rectifier 68). The junction of coil 67 and diode 68 is connected to ground through capacitor 70. The D.C. voltage developed across resistor 69 is proportional to the transmission line voltage and is opposite in polarity to the D.C. voltage developed across resistor 64. Thus by proper adjustment of tap 62, the output taken across coil 71 and output lead 72 will be zero only when the voltage and current of input line 29 indicate that the impedances are matched at a predetermined impedance value, which value may, for example, be 50 ohms if the impedance of the tunable source (connected to input line 29) is 50 ohms.

If the impedance of the output line (or antenna if a part of the output line) is less than the preselected value, then this will affect the input line current voltage relationship such that the voltage developed across resistor 64 will increase to cause an error signal of negative polarity to be produced. Likewise, if the impedance of the output line is greater than the preselected value, the net effect will cause an error signal of positive polarity to be produced.

The error signal, if any, is coupled to a servo gain and compensation network, as will be brought out more fully hereinafter, through lead 72 (and lead 59, which lead may be connected to the servo gain and compensation network through ground).

Phasing discriminators 54 and 56 may be identical and may be conventional. As shown in FIGURE 13, phasing discriminator 54 may be connected to sense the R.F. signal of input line 29 through transformer action with the coupling circuit line serving in each case as the primary and coil 73 serving as the secondary. One side of winding 73 is connected to a pair of diodes 74 and 75, connected in series, while the other side of winding 73 is likewise connected to a pair of diodes 76 and 77, also connected in series. Winding 73 is center tapped, and the center tap is connected through capacitor 78 to ground (which capacitor, in conjunction with the line capacity, as shown by dotted lines in FIGURE 13, serves as a voltage divider) and through coil 79 to the junction of resistors 80 and 81.

Resistor 80 is connected in series with resistor 82, while resistor 81 is connected in series with resistor 83. The other end of resistor 82 is connected to diode 75, while the other end of resistor 83 is connected to diode 77. In addition, the junction of diode 75 and resistor 82 is connected with ground through capacitor 84, while the junction of diode 77 and resistor 83 is connected with ground through capacitor 85.

Thus, capacitors 84 and 85 serve as an R.F. ground, while resistors 80 through 83 serve as loads for the four diodes in such a manner that the voltages developed across resistors 80 and 82 oppose the voltages developed across resistors 81 and 83. Since these developed D.C. voltages are proportional to the R.F. voltages appearing across the diodes, the output voltage with respect to ground is zero only when the voltage of the input line is in phase with the current.

When the input line voltage is not in phase with the current, there is an output error signal produced that is proportional to the phase difference. If, for example, current leads voltage slightly, as will be the case if the output line (or antenna) appears capacitive, an error signal is developed due to the line capacity (which remains in phase with the line voltage) and secondary 75 (which remains 90° out of phase with the line current).

An error signal, if produced in either phasing discriminator, is coupled therefrom through adjustable tap 86 of resistor 83, coil 87 and lead 88, while the other output is taken from the junction of diode 75 and resistor 82 through coil 89 and lead 90.

Two phasing discriminators are utilized since tuning of the double tuned tank 40 requires sensing as close thereto as possible, while, on the other hand, for final tuning sensing of the R.F. signal as it appears on input line 29 is required.

The D.C. voltage outputs from the discriminators are coupled, as shown in FIGURE 2, to servo gain and compensation network 91. In addition, another output is taken from loading discriminator 55, and this output is coupled directly to control circuit, or unit, 92. As shown in FIGURE 12, to secure this output, capacitors 93 and 94 are serially connected with a diode 95 therebetween, capacitor 93 being connected to the junction of resistors 57 and 60, and capacitor 95 being connected to the junction of coil 67 and diode 68 in the loading discriminator. In addition, one side of coil 96 is connected to the junction of diode 95 and capacitor 94, as is a resistor 97 to ground. The other side of coil 96 is connected to output lead 98, and may in addition, have a capacitor 99 connecting said other side with ground. When there is a loading error, the R.F. is sampled by this network and rectified to produce a positive D.C. voltage output, the purpose of which is brought out hereinbelow. A coil 95' is also connected between the anode of diode 95 and ground.

Figure 10:
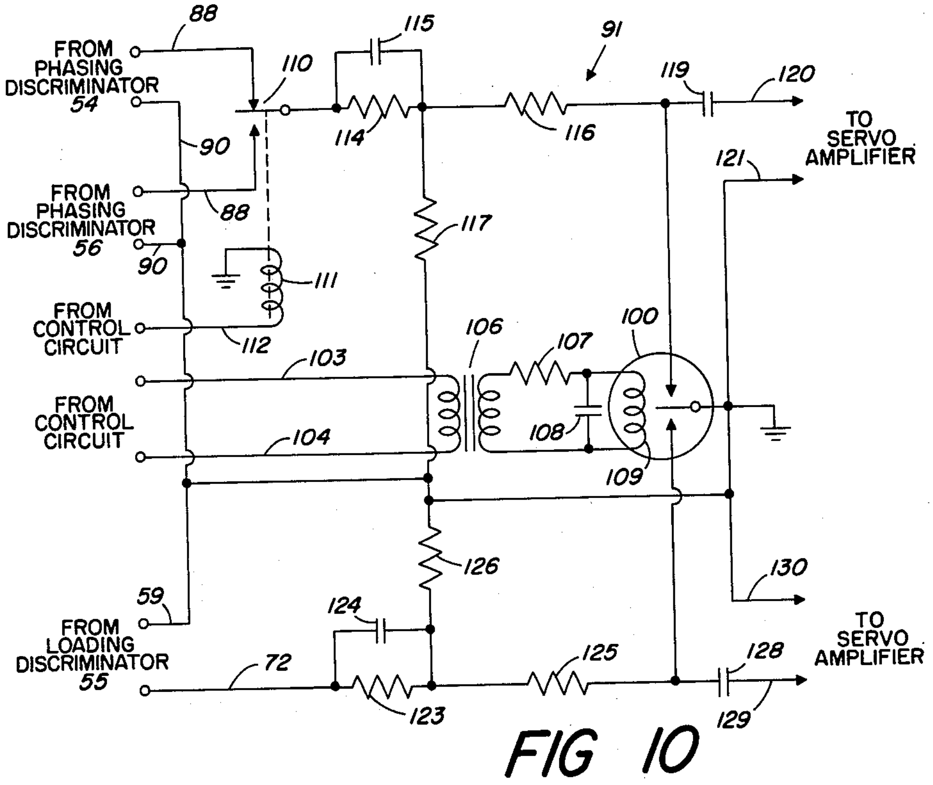
FIGURE 10 is a schematic diagram illustrating the servo gain and compensation network of FIGURE 2.

Servo gain and compensation network 91 includes, as shown in FIGURES 2 and 10, basically, a conventional chopper 100 that is energized by A.-C. voltage through power transformer 102, input leads 103 and 104 from control circuit 92, which leads, in turn, are connected to the 115 v. A.-C. power source through lead 105 and A.-C. ground, transformer 106, resistor 107, and capacitor 108, the latter of which is connected in series with chopper coil 109. Chopper 100 converts the D.-C. voltages from the discriminators to A.-C. voltages in conventional fashion, the A.-C. voltages thus produced being substantially square wave in form.

The outputs from phasing discriminators 54 and 56 are coupled through leads 88 and 90 from each discriminator to the servo gain and compensation network 91. As shown in FIGURE 10, a relay actuated switch 110 determines which phasing discriminator is connected to the servo gain and compensation network at any given time, switch 110 being controlled by relay 111, which relay is grounded at one side and energized at the other by the 28 volt power supply through control circuit 92 and, more particularly, by lead 112 therefrom. It is to be noted that phasing discriminator 54 is connected to the servo gain and compensation network except when relay 111 is energized.

The D.C. voltage coupled through switch 110 from the phasing discriminator selected is coupled through resistor 114, which resistor has a capacitor 115 connected in parallel thereacross, and resistor 116 to chopped 100. A resistor 117 is connected between the junction of resistors 114 and 116 and the other input (through lead 90) from the discriminator.

The then developed A.-C. voltage due to the phasing discriminator input is coupled from the network through capacitor 119 and lead 120, lead 121 being connected to ground in common with the movable contactor of chopper 100.

As also shown in FIGURE 10, a similar input circuit is provided from loading discriminator 55, the D.C. voltage being coupled through lead 72, resistor 123, which resistor has a capacitor 124 connected in parallel thereacross, and resistor 125. Likewise, resistor 126 is connected between lead 59 (the other input from the loading discriminator) and the junction of resistors 123 and 125. As shown in FIGURE 10, leads 90 and 59 are grounded leads.

The then developed A.-C. voltage due to the loading discriminator input is coupled from the servo gain and compensation network through capacitor 128 and lead 129, lead 130 being connected to ground in common with the movable contactor of chopper 100.

Figure 5:
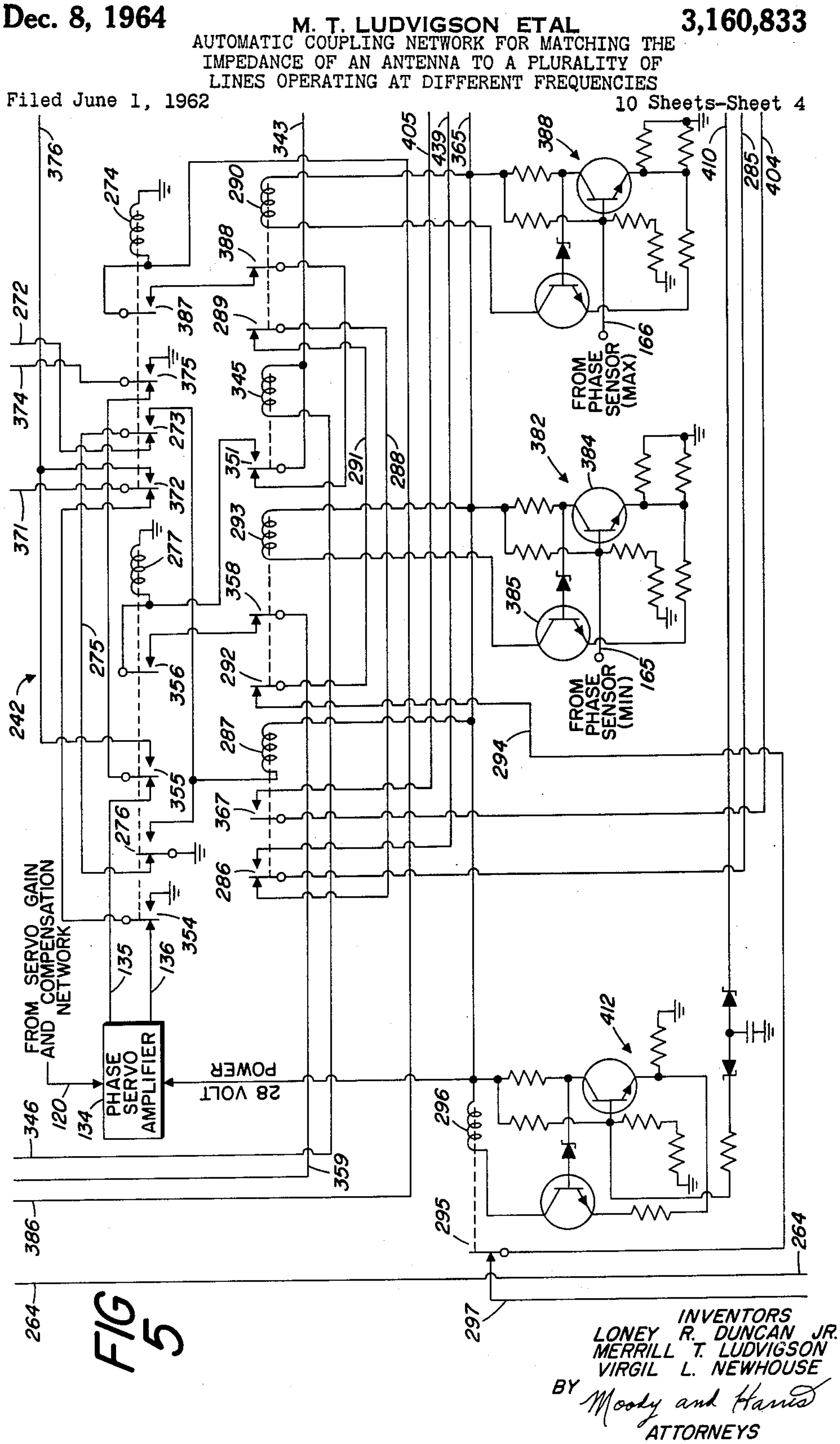

The A.-C. voltage developed from the phasing discriminators is coupled through lead 120 to conventional phasing servo amplifier 134, as shown in FIGURE 2, and then, by means of lead 135, to control circuit 92 (a second lead 136 is connectable to ground in the control circuit to provide a return path in the output circuit, as shown in FIGURE 5).

Figures 4, 9:
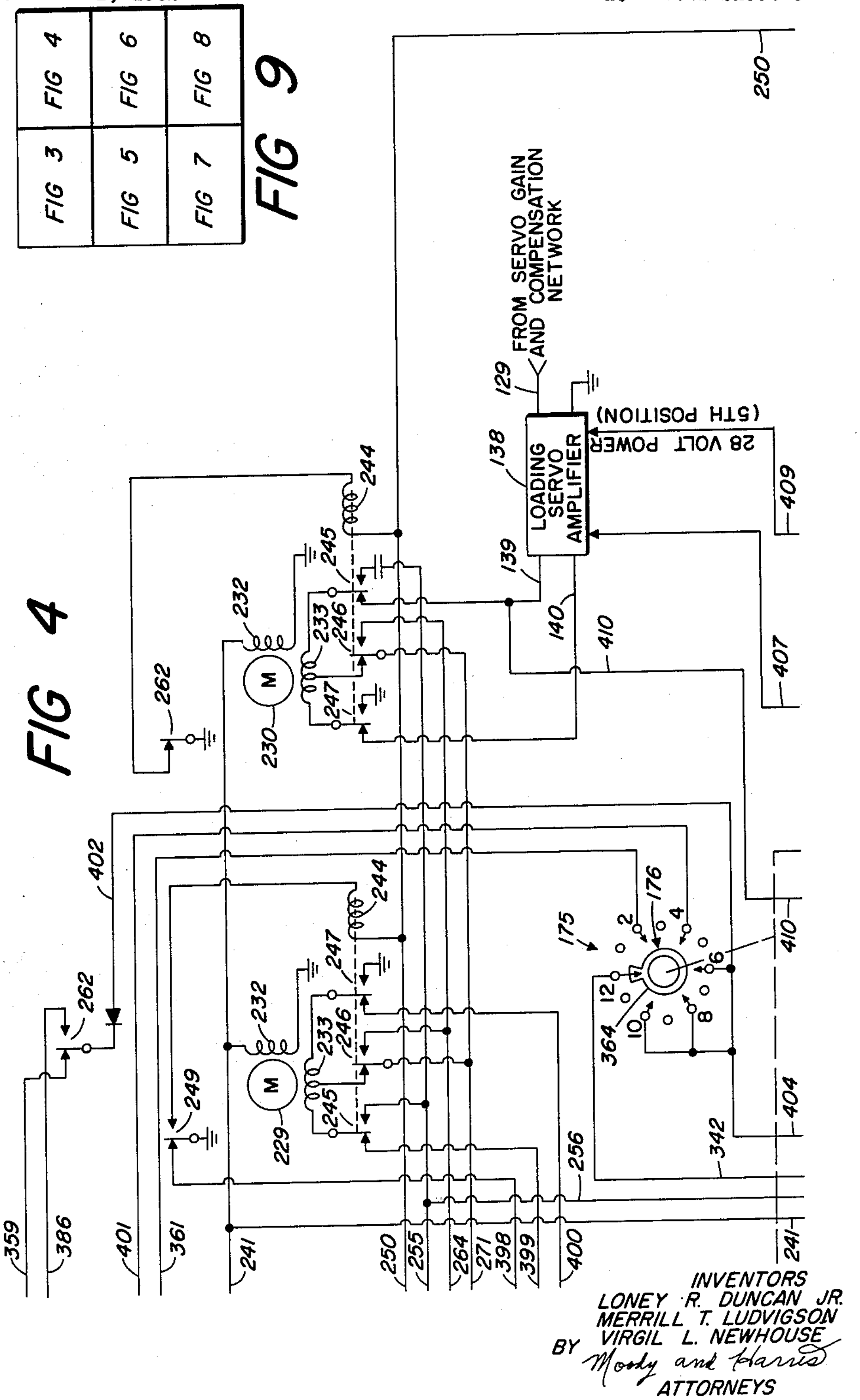
FIGURE 9 shows the proper orientation of FIGURES 3 through 8, which figures taken together illustrate the entire control unit as utilized in this invention.

In like manner, the A.-C. voltage developed from the loading discriminator is coupled from the network through lead 129 to conventional loading servo amplifier 138, and then, by means of leads 139 and 140 to control circuit 92 (either lead 139 or lead 140 providing a return path to ground from the output circuit depending upon desirable direction of motor operation, as shown in FIGURE 4).

The output from phasing servo amplifier 134 is also coupled to phase sensor 143. Phase sensor 143 is capable of monitoring the signal from the phasing servo amplifier and providing a signal only when a predetermined minimum or maximum level is reached. This information, as brought out more fully herinafter, is then utilized in the control circuit during the tuning sequence.

Figure 11:
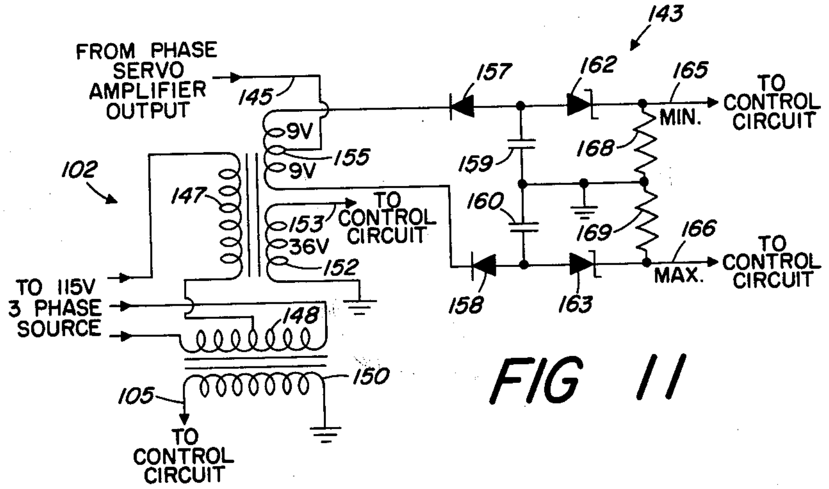
FIGURE 11 is a schematic diagram illustrating the phase sensor and A.C. power supply providing proper operational voltages of FIGURE 2.

As shown in FIGURE 11, power transformer 102 is closely associated with phase sensor 143, the input from the phasing servo amplifier 134 being coupled to the phase sensor through secondary winding 145 of the transformer. Transformer 102 is preferably a conventional Scott-T transformer having quadrature primary windings 147 and 148 fed by a three phase 115 volt A.-C. input signal source (not shown). One secondary 150 supplies the fixed motor windings through lead 105 and A.-C. ground, while 36 volt A.-C. power is provided by means of secondary winding 152 in quadrature with the A.-C. supplied to the fixed motor windings. This 36 volt A.-C. power is coupled by means of lead 153 (and A.-C. ground) to control circuit 92 for use in energizing the control winding of each A.-C. motor, as brought out more fully hereinafter.

As mentioned hereinabove, the remaining secondary winding 145 is then utilized to energize the phase sensor 143. The output from phasing servo amplifier 134 is coupled to the center tap 155 of secondary winding 145.

The opposite ends of secondary windings 145 are connected to the cathodes of a pair of diodes 157 and 158, which diodes have their anodes connected through capacitors 159 and 160, respectively, to ground, and to the anodes of Zener diodes 162 and 163, respectively. The Zener diode 162 is chosen such that the Zener breakdown voltage establishes the desired minimum sensing information needed in the control circuit, while Zener diode 163 is chosen such that the Zener breakdown voltage establishes the desired maximum sensing information needed in the control circuit.

The negative D.-C. output voltage, indicating that the minimum desired voltage has been exceeded, is taken from the cathode of Zener diode 162 through lead 165 and coupled to the control circuit, while the negative D.-C. output voltage, indicating that the maximum desired voltage has been exceeded, is taken from the cathode of Zener diode 163 through lead 166 and coupled to the control circuit. In addition, the anodes of Zener diodes 162 and 163 are connected to ground through resistors 168 and 169, respectively.

Control circuit 92, as shown in FIGURES 3 through 8 of the drawings, receives the outputs from the servo amplifiers 134 and 138, phase sensor 143, power transformer 102, and loading discriminator 55, as well as needed external information, and then provides programming for automatic sequential tuning of the coupling network to assure a proper impedance match.

To properly program the entire tuning operation, control unit 92 utilizes a plurality of programming switches, designated generally by the numeral 175. By causing the rotors (designated generally as 176) of the programming switches to sequentially step to predetermined positions, tuning is automatically accomplished by the connections made through the stationary contacts of the programming switches, as brought out more fully hereinafter.

As shown and described herein, each programming switch 175 has twelve stationary contacts and a movable contactor, or rotor, shaped to meet the particular need in bridging stationary contacts. Since, however, only six positions are needed for tuning, each programming switch is caused to move two contacts clockwise for each tuning step. In addition, it is to be appreciated that since the rotors of all programming switches are constrained to common movement, the programming switches may, in fact, be consolidated with all of the rotors mounted on a single shaft (not shown).

In matching the impedance of an output line, or antenna, to that of an input line, the rotors of programming switches 175 are caused to initially assume a first, or homing, position and then caused to advance clockwise through the six positions provided by the twelve stationary contacts (each step advances the rotors two contacts). After tuning, i.e., when the coupling network is matched for a particular frequency, retuning is unnecessary until a new frequency is selected or load impedances dictate the need for retuning.

Retuning is signaled, for example, when an operator selects a new frequency, this action at the same time supplying a ground to the multicoupler. When this ground is received at control unit 92, the programming switches are immediately caused to be automatically advanced to the homing position and thereafter through the five remaining steps of the tuning cycle, needing only an external signal to indicate that the entire system is in operate condition and also that the R.F. is present.

The six positions of the programming switches are as follows:

Position 1—Homing
Position 2—Series Circuit Tuning
Position 3—Parallel Circuit Tuning
Position 4—Load Tuning
Position 5—Antenna Tuning
Position 6—Operate

(1) *Homing Position*

As stated hereinabove, when a new frequency is selected at the tunable source by an operator, this information in the form of a ground must be supplied to the control circuit. This may be accomplished in any conventional manner such as, for example, by a switch connected so that a temporary ground is applied whenever the operator starts to select a new frequency.

Figure 7:
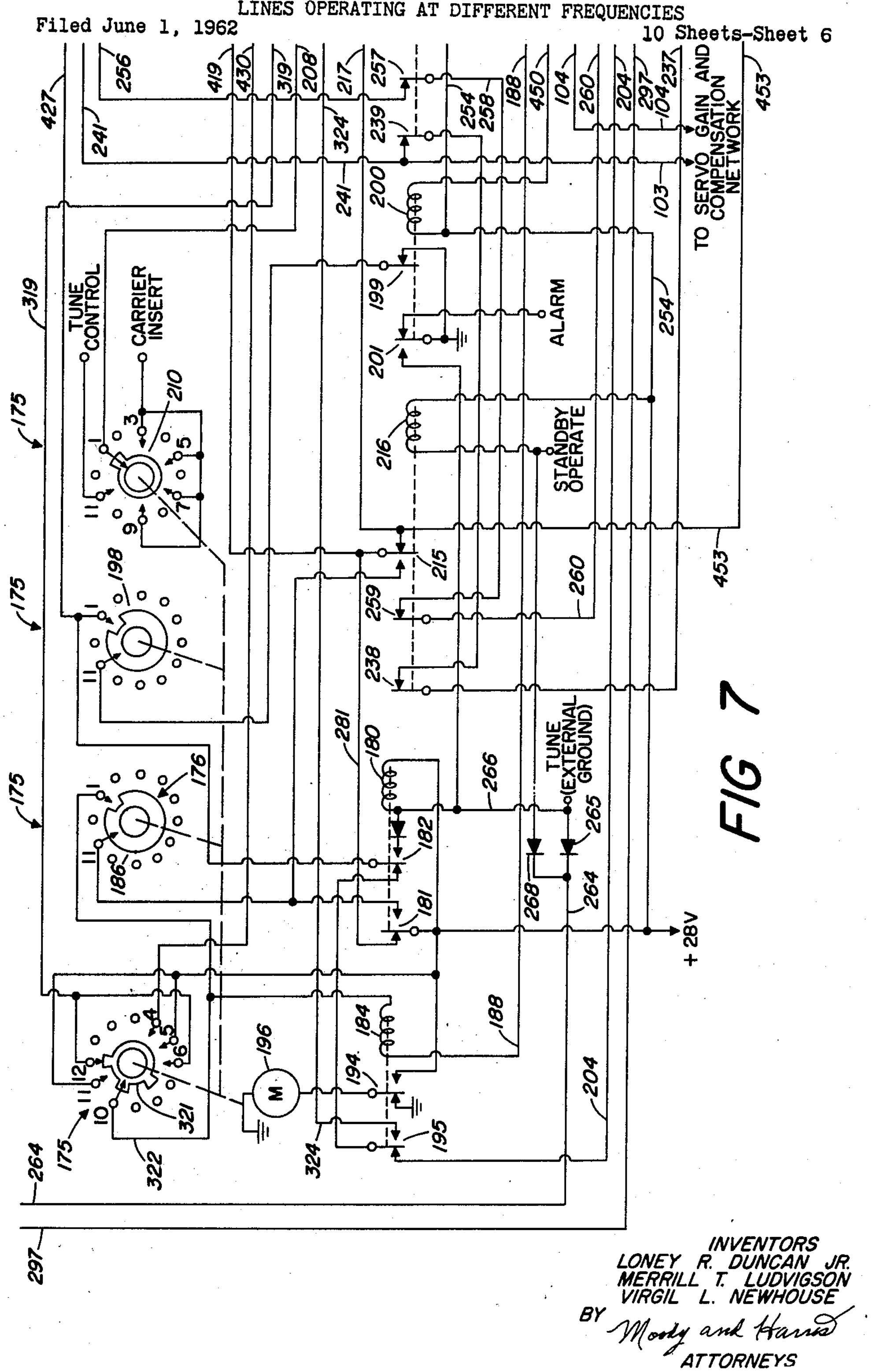

As shown in FIGURE 7, this ground is coupled to relay 180 in control circuit 92, the other side of which relay is connected to the +28 volt D.-C. power supply (not shown). Relay 180 is thereby energized to cause relay switches 181 and 182 to assume relay actuated positions (opposite to the normally nonactuated positions as shown in FIGURE 7). As shown in FIGURE 7, this causes the movable contactors of switches 181 and 182 to move to the right and away from the normal, or nonactuated positions.

In the relay actuated position, switch 181 connects the +28 volt power supply to programming switch motor control relay 184 through programming switch 186 (contacts 1 and 11). Since the other side of relay 184 is grounded through lead 188, switch 189 of RF-OFF relay 190, and either push button switch 191 or mode selector switch 192 (contacts 1 and 12), relay 184 is energized. Relay 190 is energized only when no R.F. is applied, as brought out more fully hereinafter, so that switch 189 is held in the relay actuated positions (opposite to that shown in FIGURE 8) until R.F. is applied (it is not applied initially).

Energization of motor control relay 184 causes switches 194 and 195 to assume their relay actuated positions (opposite from that as shown in FIGURE 7). Switch 194 then removes the ground from one side of programming motor 196 and connects the motor directly to the 28 volt power supply to energize the motor. Since motor 196 is connected to all of the rotors 176 of programming switches 175, the rotors are caused to be turned clockwise until the homing position is reached (all rotors 176 are shown in the drawings in the homing position). Motor 196 remains energized until the rotor of programming switch 186 arrives at the homing position (only one homing position is possible since the rotor of programming switch 186 has only a single notch). When the rotor of programming switch 186 reaches the homing position, the circuit carrying the 28 volt power to relay 184 is broken to de-energize the relay. This causes switch 194 to again assume its nonactuated position and removes the 28 volt power supply from the motor to stop it.

Since the ground externally coupled to relay 180 may be temporary, switch 182 provides a relay holding circuit through programming switch 198 (contacts 1 and 11) and switch 199 of alarm relay 200 to ground. Programming switch 198, as shown in FIGURE 7, has a rotor shaped identical to that of programming switch 186 so that this circuit is broken at the same time that relay 184 is de-energized by programming switch 186. The alarm relay, referred to hereinabove, is energized except when a fault condition occurs as brought out more fully hereinafter. Thus, switches 199 and 201 are normally maintained in the relay actuated positions and have been so shown in FIGURE 7.

Switch 195 of motor relay 184 and switch 182 of relay 180 break the circuit supplying an external ground (to indicate that the multicoupler is ready for a carrier to be inserted) during the period that either motor control relay 184 or tune-actuate relay 180 are energized. The ground to call for carrier insert is supplied through the alarm circuit switch 199, programming switch 198 (contacts 1 and 11), switch 182, switch 195, lead 204, switch 206 of two second time delay relay 207, lead 208, and programming switch 210 (contacts 1 and 3).

When the rotors of the programming switches reach the homing position, relays 212 and 213 (see FIGURE 2)

are de-energized. Deenergization of relay 213 disconnects the output line (and antenna) from the multicoupler and automatically places thereon dummy load resistor 49 (usually 50 ohms). By placing the dummy load on the line rather than the antenna there will be no effect encountered from antenna loading. De-energization of relay 212 removes resistor 34 from its connection in parallel with series trap 30 and connects the trap in series with this resistor to ground.

Figure 6:
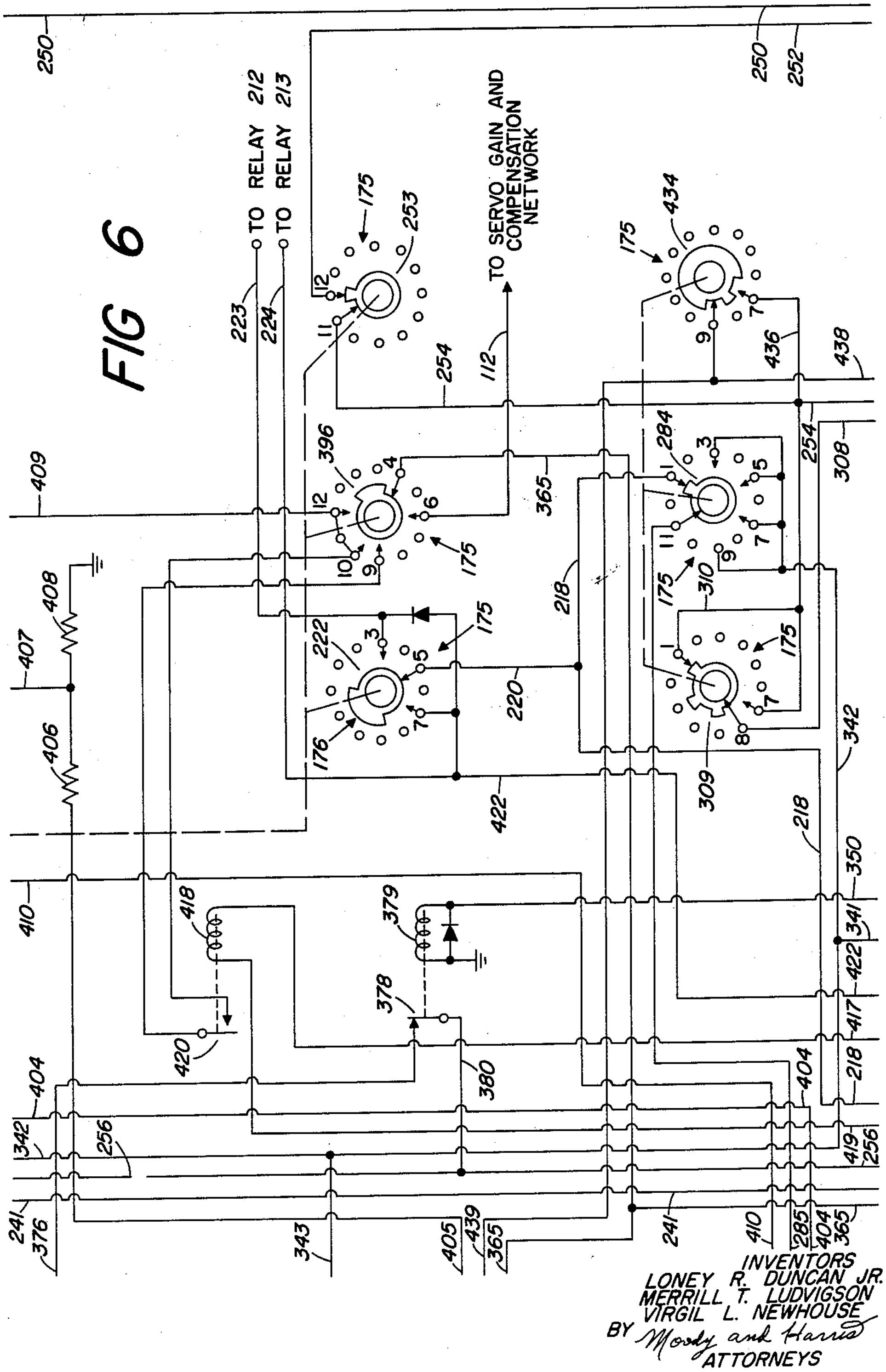

As shown in FIGURE 2, relays 212 and 213 are grounded at one side and therefore to be energized must be connected to the 28 volt power supply through the control unit 92. As shown in FIGURE 6 of the drawing, the 28 volt power is coupled to relays 212 and 213 through switch 181, switch 215 of standby-operate relay 216, lead 217, lead 218, lead 220, programming switch 222 (contacts 3, 5 and 7) and leads 223 (to relay 212) and 224 (to relay 213). Standby-operate relay 216 is energized by an externally supplied ground when in the operate condition (as shown in FIGURE 7) and is thus de-energized to signify the opposite condition, that is the standby condition. The tune-actuate relay 180, on the other hand, was de-energized when the homing position was reached, as brought out hereinabove, so that the 28 volt power supply is connected through switch 181 and switch 215 to lead 217 and then to relays 212 and 213 as brought out hereinabove. Obviously, if relay 180 is energized or if relay 216 is de-energized, this breaks the energization circuit of relays 212 and 213.

Figure 8:
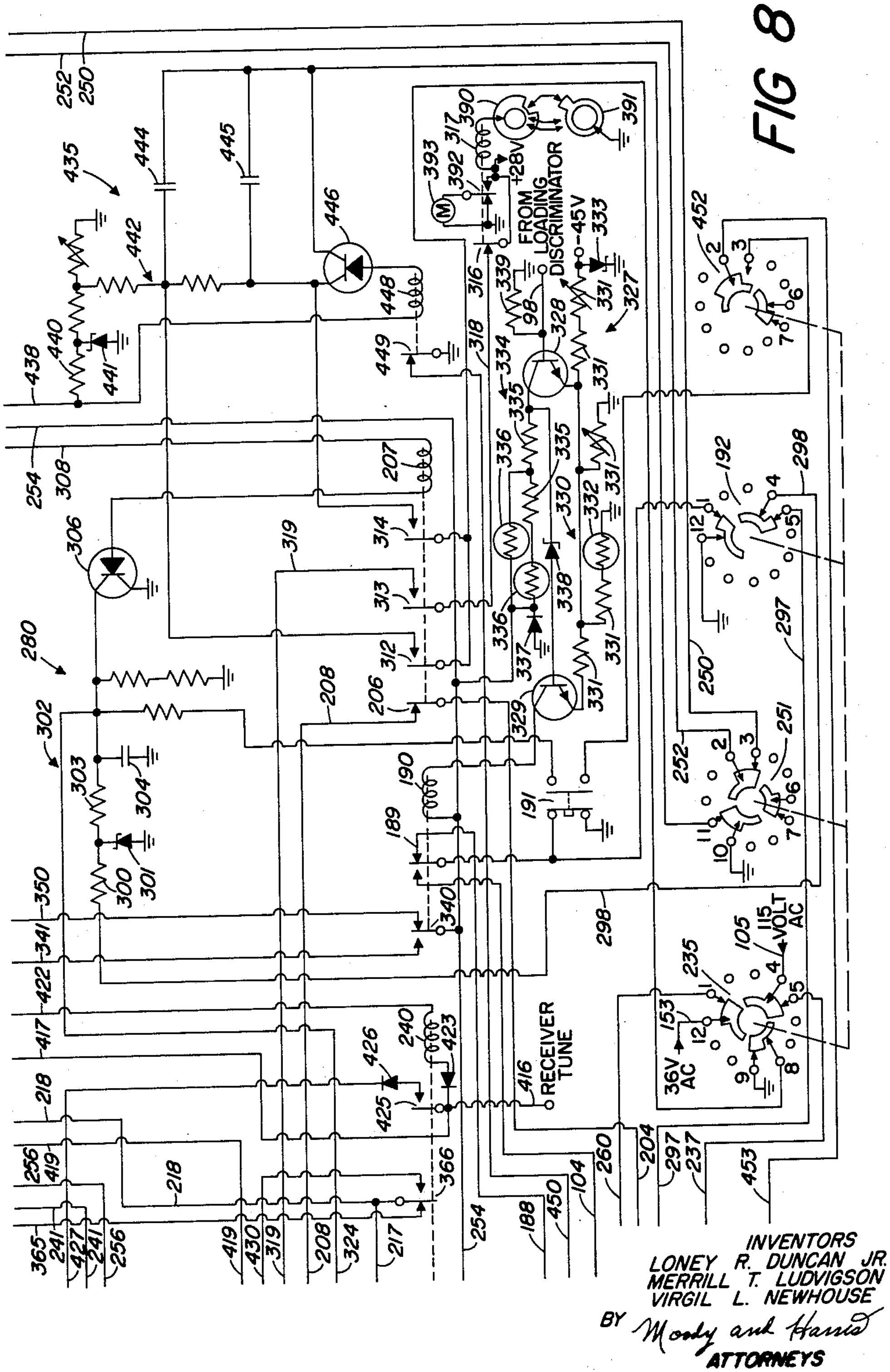

While in the homing position, A.-C. motors 227, 228, 229 and 230 are energized to cause capacitors 32, 42, and 44 to be driven to maximum capacity, and capacitor 48 to minimum capacity. As is common for A.-C. motors, the fixed winding 232 and control winding 233 must be energized in quadrature. As brought out hereinabove, this quadrature voltage is supplied through a Scott-T transformer (see FIGURE 11) and coupled to control circuit 92. As shown in FIGURES 8 and 11, 115 volt A.-C. power is coupled to control circuit 92 on lead 105 (and ground), while the 36 volt A.-C. power is coupled to the control circuit by means of lead 153 (and ground). In control circuit 92, this power is received at a mode selector which includes four multiposition switches, the rotors of which are constrained to common rotation, as is conventional. As shown in FIGURE 8, the A.-C. power is received at multiposition switch 235. It is the purpose of the mode selector to make it possible to operate the equipment automatically (normal), semi-automatically, or manually. The rotors are shown in the automatic position and must be moved one position clockwise for the semi-automatic mode of operation and two positions clockwise for manual operation. The semi-automatic mode differs from the automatic mode only in that the sequential tuning steps are not accomplished automatically but must be signaled by the operator by depressing momentary contact switch 191. In the manual position, the automatic tuning mechanism is completely disconnected and the operator can then tune the coupler manually.

Figure 3:
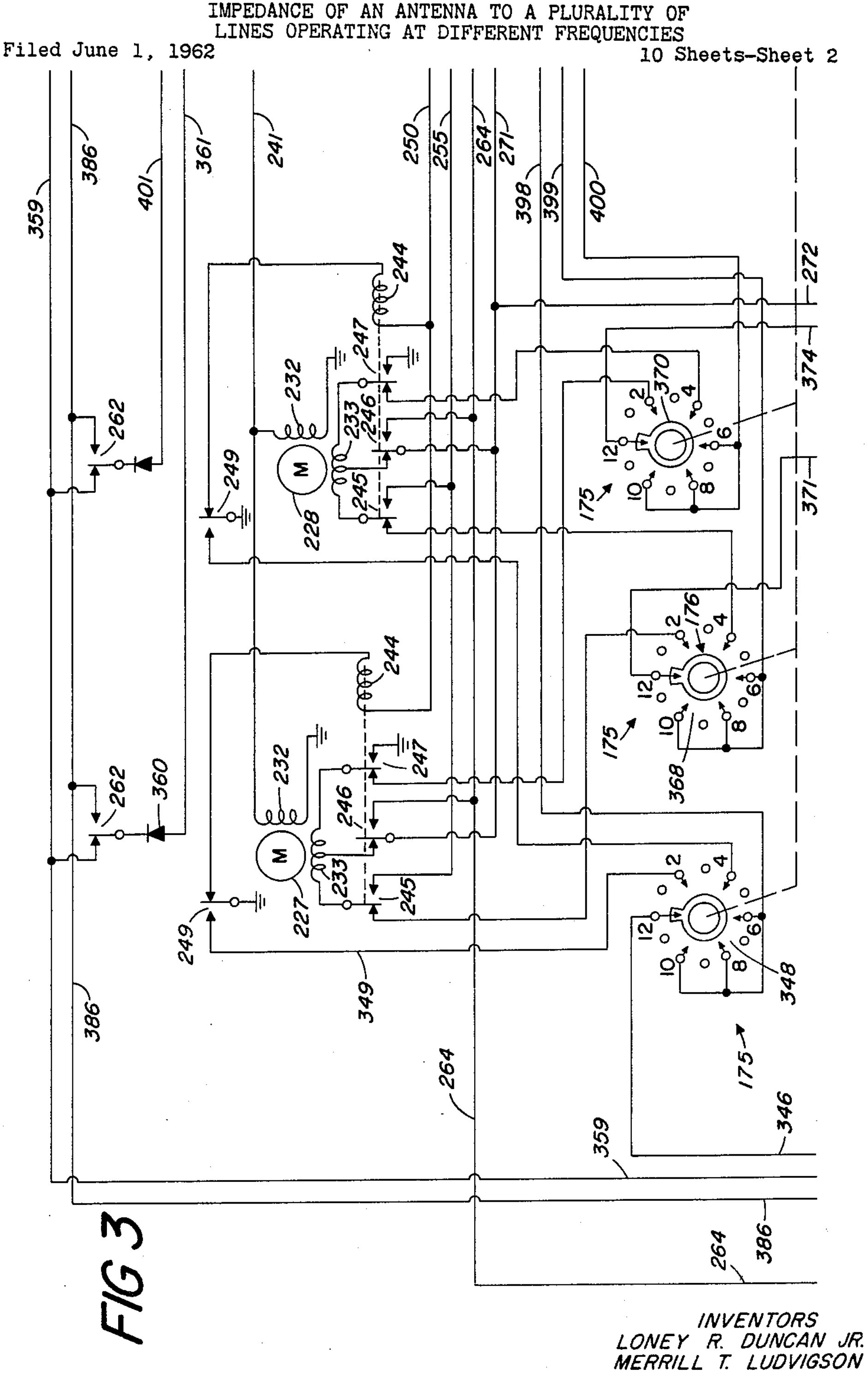
FIGURES 3 through 8 are schematic diagrams illustrating portions of the control circuit of FIGURE 2.

All four of the A.-C. motors (227–230) are energized by control unit 96 in essentially the same manner and hence the circuitry for only one motor need be explained in detail. Motor 227, as shown in FIGURE 3, for example, receives 115 volt A.-C. power at fixed winding 232 through lead 105, multiposition switch 235 (contacts 4 and 5) (mode selector switch), lead 237, switch 238 of standby-operate relay 216, switch 239 of transmit-receive relay 240 (which is de-energized at this time), and lead 241.

The control windings 233 of each A.-C. motor are, of course, energized by the quadrature phased 36 volt A.-C. power. To energize the A.-C. motors as desired, as well as driving said motors in the proper direction, a direction control and sensing unit 242, as will be brought out more fully hereinafter (this unit is shown in FIGURE 5), is provided. In addition, since for the homing position the motors must always drive the associated capacitors to a definite position (maximum capacity except for capacitor 44 which must be driven to minimum), relay 244 is provided for each motor, each relay having three switches 245, 246 and 247. Energization of homing position motor relay 244 causes switches 245, 246 and 247 to assume relay actuated positions (opposite to that shown in FIGURE 3) and this connects the 36 volt A.-C. power to motor 227 to cause capacitor 32 to be driven to maximum capacity.

Homing position motor relay 244 has one side connected to ground through limit switch 249 (maximum limit switch of capacitor 32) and the other side connected to the 28 volt power supply through lead 250, multiposition switch 251 (mode selector), lead 252, programming switch 253, (contacts 11 and 12) and lead 254.

When relay 244 is energized, switches 245, 246 and 247 assume relay actuated positions so that switch 247 supplies a ground to one side of control winding 233 of motor 227, while the other side of winding 233 is coupled to the 36 volt A.-C. power supply through switch 245, lead 255, lead 256, switch 257 of transmit-receive relay 240, lead 258, switch 259 of standby-operate relay 216, lead 260, and multiposition switch 235 (contacts 1 and 12) (mode selector). Motor 227 will then remain energized until capacitor 32 reaches the maximum capacity position, at which time limit switch 249 will open in conventional fashion to break the circuit of relay 244. This, of course, causes switches 245, 246 and 247 to resume their normal nonactuated positions (as shown in FIGURE 3) and de-energizes the motor.

Motors 228, 229 and 230 operate in exactly the same manner except that motor 230 drives capacitor 48 to minimum capacity. Therefore minimum limit switch 262 opens to de-energize motor 230, rather than a maximum limit switch as is the case for the other three motors. As shown in FIGURES 3 and 4, both a maximum and a minimum limit switch is shown for each variable capacitor in the coupling circuit that is to be tuned except for capacitor 48 which has only the minimum limit switch 262 as described hereinabove.

As shown in FIGURES 3 and 4, the control winding of each motor (227–230) is center tapped and when relay 244 is energized this center tap is connected through switch 246, lead 264, diode 265 and lead 266 to one side of tune-actuate relay 180 and one side of standby-operate relay 216 through diode 268 (connected to lead 264 and lead 269). Since the movable contactor of switch 246 is grounded (through lead 271, lead 272, switch 273 of relay 274, lead 275 and switch 276 of relay 277), relays 180 and 216 are both maintained energized so long as relay 244 is operative to drive a motor (227 to 230).

When motors 227–230 have all driven their respective capacitors to the desired limit and relays 212 and 213 have been de-energized, the tuning cycle is then ready to be automatically moved to the second, or series circuit, tuning position.

*Automatic Stepping Between Tuning Positions*

For automatic stepping between tuning positions, standby-operate relay 216 must be maintained in an energized condition (which it is except when equipment is in standby condition or shut down), and tune-actuate relay 180 must be de-energized (which it is after tuning to the homing position is completed and the motors drop out). When this occurs, the 28 volt power supply is connected to two second time delay 280. This connection is made through an interlock system including switch 181 of relay 180, lead 281, switch 215 of relay 216, lead 217, lead 218, programming 284 (contacts 1 and 11), lead 285, switch 286 of relay 287, lead 288, switch 289 of maximum sensing relay 290, lead 291, switch 292, of minimum sensing relay 293, lead 294, switch 295 of load error relay 296, lead 297, multiposition switch 192 (contacts 4 and 5) (mode selector), and lead 298.

Two second time delay 280 receives a constant voltage input by means of a resistor 300 connected to lead 298, and a Zener diode 301. The time delay itself includes an RC network 302, consisting of a resistor 303 and a capacitor 304. When the interlock switches are all in the proper positions for the 28 volt power supply to be connected to the RC time constant network 302, capacitor 304 begins to charge. When the voltage builds up sufficiently, silicon controlled rectifier 306 fires since the RC network is connected to the gate electrode. The elapsed time required for the silicon controlled rectifier to fire is two seconds.

As is conventional, after the voltage builds up sufficently so that silicon controlled rectifier 306 fires, conduction is permitted through the rectifier. As shown in FIGURE 8, a ground is therefore thereafter connected to one side of time delay relay 207 to energize the same since the other side of relay 207 is connected to the 28 volt power supply through lead 308, programming switch 309 (contacts I and 8) lead 310, and lead 254.

Energization of time delay relay 207 causes switches 206, 312, 313 and 314 to assume their relay actuated positions (opposite to that shown in FIGURE 8). This couples the 28 volt power supply through switch 316 of link motor relay 317, lead 318, switch 313, lead 319, programming switch 321 (contacts 10 and 12), and lead 322 to motor control relay 184 to energize the same. Programming switch 321 is so arranged that once relay 184 is energized and the motor starts to turn the rotors of the programming switches (which would ordinarily break the circuit of relay 184), the relay will remain energized until two stationary contacts are stepped. In other words, each time a step is made in the tuning cycle, a stationary contact is by-passed so that the 12 position switch readily provides six tuning positions. This is accomplished by having the 28 volt power constantly present at contacts 5 and 11 of programming switch 321 and proper selection of a rotor as shown in FIGURE 3.

Before the motor has turned the rotors of the programming switches so that more than one stationary contact is bypassed for each tuning step, that is, before the rotors have been rotated clockwise more than one sixth of a revolution, the 28 volt power must be removed from contacts 6 and 12 of programming switch 321. This is accomplished when the rotor of programming switch 309 is rotated since the switch is in the energization circuit for relay 207. Thus, when the rotor of programming switch 309 started to rotate, relay 207 was de-energized to cause switch 313 to assume its nonactuated or normal position (as shown in FIGURE 8).

To assure proper delay for each step of the tuning cycle, the time delay circuit is completely discharged after the programming switches have been moved to the next position by supplying a ground to the delay circuit while motor control relay 184 is energized through switch 199, programming switch 198 (contacts 1 and 11), switch 182 of relay 180, switch 195 of energized relay 184 and lead 324.

(2) *Series Circuit Tuning Position*

At the second, or Series Circuit Tuning Position, it is necessary to series resonate series trap 30. As brought out hereinbefore, the series trap 30 was disconnected from the remainder of the coupling circuit at the start of the tuning cycle by connecting the same through a 50 ohm load to ground, and an inductor 37 was also inserted in series to give continuity from the input R.F. line through the 50 ohm resistor to ground for transmitter protection. Tuning of series circuit, or trap, 30 is accomplished by varying capacitor 32 until series resonance occurs. Since the positioning of capacitor 32 is controlled by motor 227, it is thus necessary to energize motor 227, and maintain it energized until resonance occurs through a sensing circuit. Such a circuit 242 is provided, and as shown in FIGURE 5, controls the direction of the motor as well as sensing error.

With a transmitter connected to the coupling circuit, an indication that R.F. is present on the input line is received from loading discriminator 55 through output lead 98 therefrom. As shown in FIGURES 2 and 8, this indication in the form of a positive D.C. voltage, is coupled to threshold detector 327. Threshold detector 327 is a monostable circuit having a pair of transistors 328 and 329, one of which is normally conductive and the other of which is normally nonconductive. As shown in FIGURE 8, transistor 329 is normally conductive while transistor 328 is normally nonconductive. Since relay 190 is energized through transistor 329, relay 190 is energized except when an output from the loading discriminator indicates the presence of R.F. on the input line.

Threshold detector 327 forms the basis of copending U.S. patent application, Serial No. 200,030, entitled "Low Level Threshold Detector" filed on June 1, 1962 by Robert C. Bullene, and assigned to the assignee of the present invention. In essence, when a positive voltage of sufficient magnitude is received on the base of transistor 328 to overcome the cutoff bias on the emitter due to conduction of transistor 329, transistor 328 starts to conduct causing transistor 329 to become nonconductive. When the input signal falls below the desired threshold, the circuit will return to the normal operation with transistor 329 conductive and transistor 328 nonconductive. As shown in FIGURE 8, cut-off bias is normally on the emitter of transistor 328 due to conduction of transistor 329. Conduction through transistor 328 is controlled, however, by a voltage divider 330 connected to the emitter of the transistor and having both resistors 331, a thermistor 332 and a Zener diode 333, as well as a temperature compensation network 334 having resistors 335, thermistors 336 and a diode 337. Coupling between the collector of transistor 328 and the base of transistor 329 is by Zener diode 338, while the base of transistor 328 has a resistor 339 to ground.

Thus with the presence of R.F. on the input line, as would be necessary to tune series circuit 30, RF-OFF relay 190 is de-energized, and switches 189 and 340 assume their nonactuated positions (opposite to that shown in FIGURE 8). This connects the 28 volt power supply through lead 254, switch 340 of RF-OFF relay 190, lead 341, lead 342 and lead 343 to one side of maximum limit sensing relay 345, the other side of which is grounded through lead 346, programming switch 348 (contacts 2 and 12), and lead 349 to the limit switch 249 of motor 227 (which switch when run to maximum at homing is in the position shown opposite to that of FIGURE 3). When switch 340 assumes non-actuated position, this de-energizes the auxiliary RF-OFF relay on lead 350.

With the maximum limit relay 345 energized, switch 351 assumes an actuated position (opposite to that as shown in FIGURE 5) and the 28 volts present at one side of maximum limit relay 345 is thus coupled through switch 351 to minimum relay 277, the other side of which is grounded. This, of course, energizes relay 277 and causes switches 276, 354, 355 and 356 to assume relay actuated positions (opposite to that shown in FIGURE 5). A relay holding circuit for relay 277 is provided through switch 356, switch 358 of minimum sensing relay 293 (unenergized), lead 359, minimum capacity limit switch 262, diode 360, lead 361, programming switch 364 (contacts 2 and 12), lead 342, lead 341, switch 340 and lead 254 to the 28 volt power supply.

When switch 276 was actuated by minimum relay 277, this supplied a ground to forcing relay 287, which relay is connected at its other side to the 28 volt power supply through lead 365, switch 366 of relay 240, lead 217, switch 215, lead 281, and switch 181 of relay 180. While relay 287 is energized, switches 286 and 367 assume relay actuated positions (opposite to that shown in FIGURE 5).

When switches 354 and 355 are switched to the relay actuated positions, phasing servo amplifier 134 is disconnected from motor 227. Motor 227 is then caused to drive capacitor 32 from the maximum capacity limit. So that the servo amplifier 134 will continue to see the same load, a coil (not shown) may be switched across the output leads 135 and 136, if found to be necessary. This could be done by additional switches (not shown) actuated by relay 287.

When relay 277 was energized, the center tap was removed from the control winding of motor 227 by the opening of switch 276. This allowed motor 227 to be energized since both ends of the control winding were connected through switches 368 and 370 to the 36 volt power supply to run the motor. As shown in the drawings, one side of the control winding is connected through switch 245 of relay 244, programming switch 368 (contacts 2 and 12) lead 371, switch 372 of relay 274 (de-energized), and switch 354 of energized relay 277 to ground. The other side of the control winding is connected through switch 247 of relay 244, programming switch 370 (contacts 2 and 12) lead 374, switch 375 of relay 274 (de-energized), switch 355 of relay 277 (energized position) lead 376, switch 378 of RF-OFF auxiliary relay 379 (de-energized), lead 380, lead 256, switch 257 of transmit-receive relay 240, lead 258, switch 259 of standby-operate relay 216, lead 260, and multi-position switch 235 (contacts 1 and 12) (mode selector). In tracing this circuitry, it can be easily seen that if the maximum relay 274 had been energized in place of the minimum relay 277, the motor would have been driven in the opposite direction. However, since capacitor 30 was driven to the maximum position at homing, initially, the drive must be toward minimum.

With motor 227 now energized, it will continue to run until minimum sensing relay 293 is energized. Minimum sensing relay 293 is controlled by a monostable trigger circuit 382 shown in FIGURE 5. This circuit receives a negative D.C. volytage from phase sensor 143 and, in operation, is similar to the circuit shown and described hereinabove with respect to threshold detector 327 except that the input transistor 384 is normally conductive while transistor 385 connected to relay 293 is normally non-conductive.

The negative D.C. output from the phase sensor, as brought out hereinabove, is coupled to the control circuit for minimum sensing by means of lead 165. This D.C. voltage is negative and is coupled to the base of NPN transistor 384 to cut off conduction (transistor 384 is normally conductive) thereby causing transistor 385 to conduct to energize relay 293. When the input signal level drops below a predetermined threshold, transistor 384 again conducts and transistor 385 is again cut off, as is conventional. Thus, relay 293 is energized only when transistor 385 conducts since the ground is coupled through transistor 385 to the relay.

When relay 293 is energized, switches 292 and 358 assume relay actuated positions. This breaks the holding circuit for relay 277 and switches 276, 354, 355 and 356 then revert to their normal nonactuated positions. Phasing servo amplifier 134 is thus connected to motor 227 through switch 355 of relay 277, switch 375 of relay 274, lead 374, programming switch 370 (contacts 2 and 12) and switch 247 (switch 354 supplies ground again). Phasing discriminator 54 will now continue to drive motor 227 until a null occurs to indicate that the series circuit 30 is tuned to resonance. In addition, when switch 276 assumes its nonactuated position, this breaks the circuit of forcing relay 287 and causes switches 286 and 367 to assume nonactuated normal positions.

As described hereinabove, when motor 227 was initially energized to drive capacitor 32 toward minimum capacitance, the motor continued to drive the capacitor in the minimum direction until the minimum direction signal was received to connect the servo amplifier (and phase discriminator 54) to the motor for nulling. Should motor 227 run, however, to the minimum limit before the minimum direction signal is received, minimum limit switch 262 energizes maximum relay 274 by coupling the 28 volts power to the relay through lead 386, minimum limit swich 262, diode 360, lead 361, programming switch 364 (contacts 2 and 12), lead 342, lead 341, switch 340 of relay 190 and lead 254.

Energization of maximum relay 274 causes switches 273, 372, 375 and 387 to assume relay actuated positions (opposite to that shown in FIGURE 5). A relay hold circuit is then formed for relay 274 to the 28 volt power supply through switch 387, switch 388 of relay 290, switch 351 of relay 345, lead 343, lead 342, lead 341, switch 340 of relay 190, and lead 254 to the 28 volt power supply. Also, the hold circuit of relay 277 is broken by minimum limit switch 262 and relay 277 is therefore de-energized. As can be readily seen from FIGURES 3 and 5, the effect of de-energizing relay 277 and energizing relay 274 is to reverse the leads to the motor control winding and therefore the direction of operation of the motor is reversed.

When motor 227 drives capacitor 32 towards maximum capacity, a maximum direction signal is detected by phase sensor 143 and utilized to energize maximum sensing relay 290. This negative D.C. voltage, as shown in FIGURE 11, is coupled to trigger circuit 388 through lead 166. Trigger circuit 388 is identical to trigger circuit 382 and operates in the same manner to energize relay 290 when a negative D.C. voltage is received from phase sensor 143 and de-energizing relay 290 when a null occurs.

Assuming again that motor 227 is driving capacitor 32 toward minimum, relay 293 is de-energized by trigger circuit 382 when motor 227 nulls, as brought out hereinabove. This causes switches 292 and 358 to assume non-actuated positions and again completes the interlock circuit necessary to energize the two second time delay circuit 280 for causing automatic sequential tuning to the next position in the same manner as described hereinabove with respect to stepping from the first to the second tuning position.

As described with respect to moving from the homing position to the series circuit tuning position, the 28 volt power supply is connected to motor control relay 184 through link relay switch 316. Link relay 317 must therefore be in a non-energized position for automatic tuning of the programming switches to the next position. Relay 317 is energized only when rotors of switches 390 and 391 (shown in FIGURE 8) do not complete a circuit to ground. The rotor of switch 391 is constantly tied to ground and has a single ear projecting for engagement with the stationary contacts of the switch, while the rotor of switch 390 has a single notch so that the rotor is engaged with all but one stationary contact at any time. As indicated, each stationary contact associated with one switch is electrically tied to a corresponding stationary contact associated with the other switch.

Switch 390 controls link 46 (FIGURE 2) to cause the same to be moved with respect to winding 41 and therefore change the input coupling to the double tuned tank circuit 40. Switch 391 is connected with motor 227 and the rotor is constrained to rotation with the drive shaft (not shown) thereof.

Since motor 227 is utilized to position capacitor 32 in series resonating series trap 30, the link coupling is therefore adjusted by switches 390 and 391 to obtain the optimum coupling condition. Varying capacitor 32 causes a ground to be placed on one side of relay 317 to energize the relay since the other side is connected to the 28 volt power supply.

Energization of relay 317 causes switches 316 and 392 to assume relay actuated positions so that switch 392 connects link motor 393 with the 28 volt power supply. Motor 393 then adjusts the link coupling until the notched portion of rotor 390 is aligned with the corresponding stationary contact engaged by the ear of rotor 391. When this occurse, relay 317 is de-energized and motor 393 stops because switches 316 and 392 again assume normal nonactuated positions.

When switch 316 is again in a nonactuated position, the 28 volt power supply can thus energize the motor control relay 184 to cause the programming switches to assume the third, or parallel circuit tuning position.

(3) *Parallel Circuit Tuning Position*

When programming switches 175 reach the third position, relay 212 (FIGURE 2) is energized to parallel resistor 34 across the series trap 30, and the series trap is also again connected to the remainder of the multicoupler, and more particularly to link 46. Relay 212 is energized by applying 28 volts through programming switch 222 (contacts 3 and 5) lead 220, lead 218, switch 366 of relay 240, lead 217, switch 215 of relay 216, lead 281, and switch 181 of relay 180.

In addition, the output of the second phasing discriminator 56 is connected through the servo gain and compensation network 91 and servo amplifier 134 to drive motor 228, which motor is used to position capacitor 42.

As shown in FIGURE 10, relay 111 is energized when the second discriminator 56 is to be connected into the circuit. This relay is energized through lead 112, programming switch 396 (contacts 4 and 6) (FIGURE 6), lead 365, switch 366 of relay 240, lead 217, switch 215 of relay 216, lead 281 and switch 181 of relay 180.

As shown in FIGURE 3, when the programming switches were moved to the third position, the motor direction and sensing circuitry (shown in FIGURE 5) was disconnected from the control winding of motor 227 and connected to the control winding of motor 228 (see programming switches 348, 368, 370 and 364). In this position the motor 228 is driven in the same manner as described with respect to motor 227 until such time as motor 228 nulls to indicate that the input tuned circuit of double tuned tank circuit 40 has been tuned.

It has been found necessary to utilize the second phasing discriminator 56 to eliminate the effect of stray capacities across inductor 46 during tuning of the input tuned circuit. It should also be remembered at this time that the output tuned circuit has been shorted by switch 47 when motor 229 drove capacitor 44 to the maximum capacitance limit.

When the input tuned circuit is resonated and the null occurs so that all switches in the direction and sensing circuit 242 have attained their normal nonactuated positions, the interlock system is again complete to energize the two second time delay. As brought out hereinabove, this energizes motor control relay 184 and causes the programming switches to advance to the fourth, or load tuning position.

(4) *Load Tuning Position*

After the programming switches have advanced to the fourth, or Load Tuning Position, programming switches 348, 368, 370 and 364 now connect the direction control and sensing circuit 242 to motor 229, which motor, as shown in FIGURE 2, is connected to parallel capacitor 44. As shown in FIGURES 3 and 4, contact 6 of programming switch 348 is connected to minimum limit switch 249 by lead 398, contact 6 of programming switch 368 is connected to the control winding of motor 229 by lead 399, and contact 6 of programming switch 370 is connected to the other side of the control winding of motor 229 by lead 400. In addition, programming switch 364 (FIGURE 4) has contact 4 connected with the maximum limit switch 262 of motor 228 through lead 401 and contact 6 connected with the maximum limit switch 262 of motor 229 through lead 402.

The tuning procedure is the same as described hereinabove with respect to motors 227 and 228 with the direction and sensing circuit 242 (FIGURE 5) again causing the motor to be driven until a null occurs to indicate tuning is complete.

It is to be noted, however, that relay 111 was deenergized when programming switch 396 moved to the fourth position. Therefore, phasing discriminator 54 is used in sensing the phasing error. Also, during the fourth position tuning, capacitor 48 is at minimum capacitance and hence has little effect upon the resonance of the output tuned circuit. In addition, of course, the shorting switch 47, which is operative only at the maximum limit, opened when motor 229 started to drive capacitor 48 toward a minimum.

In the fourth, fifth, and sixth tuning positions, it is possible for both the phasing error correction loop and the loading error correction loop to be operative at the same time in some instances. For example, when a transmitter is being tuned, this occurs in the fifth tuning position and for a receiver in the fourth tuning position as brought out hereinafter.

In any event, circuitry is provided in the fourth, fifth and sixth positions whereby the loading servo amplifier is blocked whenever the phasing servo amplifier is supplying a signal to energize motor 229. To accomplish this the 28 volt power is coupled through lead 254, switch 340 of relay 190, lead 341, lead 342, programming switch 364 (contacts 6, 8, 10 and 12) lead 404, lead 367 of forcing relay 287, lead 405, resistor 406 and lead 407. In addition, a resistor 408 may be provided to ground at the junction of resistor 406 and lead 407. The 28 volts (or less depending on that dropped across resistor 408) may be used conventionally in the loading servo amplifier to bias an amplifier tube to cut off, for example.

After a null occurs, indicating that load tuning is completed, the programming switches are then caused to be advanced to the fifth, or Antenna Tuning Position in the same manner as described hereinabove with respect to the other positions by means of the two second time delay circuitry.

(5) *Antenna Tuning Position*

After the programming switches have been caused to move to the fifth, or Antenna Tuning Position, antenna relay 213 is energized so that the dummy load is disconnected from the coupling circuit and the coupling circuit again connected to the antenna. Relay 213 is energized by coupling the 28 volt power supply thereto through switch 181 of relay 180, lead 281, switch 215 of relay 216, lead 217, lead 218 and programming switch 222 (contacts 5 and 7).

In the fifth tuning position, the loading servo amplifier 138 is now in operation for the first time (for transmitter tuning). The 28 volt power supply is connected through switch 181 of relay 180, lead 281, switch 215 of relay 216, lead 217, switch 366 of relay 240, lead 365, programming switch 396 (contacts 4 and 10) and lead 409 to loading servo amplifier 138. As shown in FIGURE 2, loading discriminator 55 is connected through the servo gain and compensation network 91 to loading servo amplifier 138 and the output therefrom coupled to control unit 92 to energize motor 230, which motor controls the operation of series capacitor 48.

The output from loading servo amplifier 138 is, as shown in FIGURE 4, coupled to opposite sides of the control winding of motor 230 by means of leads 139 and 140 through the homing relay switches (relay 244 is, of course, not energized after homing position). In addition, the output of the amplifier is coupled from lead 139 through lead 410 to loading trigger circuit 412. Loading trigger circuit 412, like trigger circuits 382 and 388, is monostable so as to maintain relay 296 de-energized until a D.C. voltage is received, and then de-energizing the relay again as soon as the motor nulls.

In the fifth tuning position, programming switches 348, 368, 370 and 364 still maintain phasing discriminator 54 in driving relationship with motor 229. Thus, not only can the loading discriminator cause series capacitor 48 to be adjusted, but at the same time the phasing discriminator can cause shunt capacitor 44 to also be adjusted. As brought out hereinabove, however, whenever the phasing discriminator is causing shunt capacitor 44 to be adjusted, the loading servo amplifier is blocked. Thus, only after the phasing error is reduced to zero can the loading discriminator drive capacitor 48 to eliminate loading error. When both loops are at a null tuning is complete.

When the loading and phasing discriminators have been nulled, only then will the interlock switches close to again energizes the two second time delay so that the programming switches are moved to the sixth, or operate position.

After the fifth position tuning, the multicoupler presents a very high back impedance and has high selectivity so that more than one transmitter or receiver may be utilized with a common antenna.

*Tuning for Receiver Operation*

If the antenna is being tuned for receiver operation (rather than transmitter operation as described hereinabove), then in the fourth, or load tuning position, a ground is externally supplied at the receiver-tune input and coupled through leads 416 and 417 to auxiliary receiver-transmit relay 418. Since the other side of relay 418 is connected to the 28 volt power supply through lead 419, lead 281, and switch 181 of tune-actuate relay 180, relay 418 is energized causing switch 420 to close. This connects contact 9 of programming switch 396 to contacts 10, 11 and 12 and thus turns on load servo amplifier 138 one position earlier than described hereinabove for transmitter tuning. This is due to the feasibility of tuning a receiver with the dummy load connected rather than the antenna. Since the phasing discriminator 54 is already energized in the fourth position, the result is that the double loop, i.e., the phasing discriminator 54 tuning the shunt capacitor 44 and then the loading discriminator 55 tuning the series capacitor 48 (blocking signal prevents loading discriminator from acting first to reduce error), achieves a final tune in the fourth position rather than in the fifth position.

Thus, with the final tune already completed for receiver tuning, the programming switches are caused to bypass the fifth step and go immediately to operate. This is accomplished by supplying 28 volts power through switch 181, lead 281, switch 215, lead 217, lead 218, lead 220, programming switch 222 (contacts 5 and 7) and lead 422 to relay 240, the other side of which is grounded by the receiver-transmit input line 416 through diode 423.

Energization of relay 240 causes switches 239, 257, 366 and 425 to assume relay actuated positions (opposite to that shown in FIGURE 8). Opening of switches 239 and 257 opens the motor winding circuits while a relay hold circuit to ground is formed by switch 425, diode 426, lead 427, programming switch 198 (contacts 1 and 11) and switch 199 of relay 200.

Switch 366, when actuated by relay 240, couples the 28 volt power, present at its movable contactor, through lead 430 to contact 4 of programming switch 321. The effect of this is to cause the motor control relay 184 to remain energized when the fifth tuning position is reached so that the motor 196 continues to turn the programming switches without a stop at the fifth position. When the sixth, or operate, position is reached, the motor is de-energized as brought out hereinabove in connection with any other repositioning in the tuning sequence.

(6) *Operate Position*

In the sixth, or operate, position the circuit calling for R.F. through the carrier insert output (by supplying a ground from this output) is opened by programming switch 210. In place of this, a ground is coupled from the tune control output (contact 11 of programming switch 210) to indicate that the multicoupler is tuned and ready for use either with a transmitter or a receiver. This ground is supplied through switch 199 of relay 200, programming switch 198 (contacts 1 and 11), switch 182 of relay 180, switch 195 of relay 184, lead 204, switch 206 of relay 207, lead 208 and programming switch 210 (contacts 1 and 11).

In the operate position, phasing discriminator 54 remains connected to drive motor 229, and loading discriminator 55 remains connected to drive motor 230. Thus, if the impedance of the antenna changes with respect to any given multicoupler, as will be the case, for example, if another transmitter or receiver is connected to the common antenna, the motors will drive to reduce the error (phasing, loading or both) to zero.

*Alarm Circuit*

In addition, a fault, or alarm, circuit is also provided in control unit 92 Such an alarm would be actuated, for example, by loss of R.F. In addition, a time interval for tuning is also established so that if in any position more than one minute is required for tuning (except for homing and operate), a fault is indicated to open the alarm relay circuit and de-energize alarm relay 200. Whenever alarm relay 200 is de-energized, switch 201 connects a ground to tune-actuate relay 180 causing the programming switches to be immediately brought to the homing position in the same manner as described in connection with selection of a new frequency.

As shown in FIGURE 6, programming switch 434 has a rotor with two notches signifying the two positions (homing and operate) where the one minute time delay alarm circuitry 435 cannot be energized. The 28 volt power is present at contact 7 of programming switch 434 since this contact is tied to lead 254 by lead 436. Thus whenever programming switch 434 is in a position other than homing, or operate, the 28 volt power supply is coupled through programming switch 434 (contact 9) and lead 438 to the one minute alarm circuitry 435. The 28 volt power supply is also coupled to the one minute alarm circuitry 435 during the time the forcing relay is energized through lead 254, switch 340 of relay 190, lead 341, programming switch 284 (contacts 3, 5, 7, 9 and 11), lead 285, switch 286 of forcing relay 287, lead 439 and lead 438.

The 28 volts received at one minute alarm circuitry 435 is coupled through resistor 440 and by Zener diode 441 to RC network 442, where capacitors 444 and 445 are charged to the voltage necessary to fire silicon controlled rectifier 446. The components are selected so that this takes one minute. When the rectifier 446 fires, relay 448 is energized to open switch 449 and de-energize alarm relay 200, which is grounded through lead 450 and switch 449.

In operation, a plurality of transmitters 19 and receivers 20 may be connected to a common antenna by use of a multicoupler of this invention connecting each transmitter or receiver to the antenna. Each multicoupler is then tuned to a specific frequency, such as, for example, those shown in FIGURES 14, 15, 16 and 17. It is not necessary, however, that the frequencies selected be as divergent as indicated by FIGURES 14, 15, 16 and 17, since, as shown by these figures, the multicoupler of this invention is capable of high selectivity with no back impedance holes off resonant frequency of any consequence. It has been found that spacing between chosen frequencies can be about 0.3 mc. without impairing efficient operation.

Thus, with the multicoupler set in the automatic mode, the operator need only select the frequency desired for each unit (transmitter or receiver) and the ground supplied to the tune-actuate relay in the control circuit of each multicoupler will cause that multicoupler to be automatically tuned to the selected frequency (provided, of course, that a transmitter is connected to the multicoupler during the tuning operation). If the operator should desire semi-automatic tuning of the multicoupler, the selector mode switch is tuned to a position one contact clockwise (as shown in FIGURE 8). This connects the 28 volt power supply (through switches 181 and 215) to push button switch 191 through multiposition switch 452 (mode selector) and lead 453 and allows step tuning at the will of the operator when he depresses button 191.

If manual tuning should be desired, the mode selector switch is tuned to a position two contacts clockwise from the automatic positioning. This removes all power from the multicoupler and enables the coupling circuit to be tuned manually.

In view of the foregoing, it should be evident to those skilled in the art that the multicoupler impedance matching network of this invention provides a novel coupling circuit and means for automatic tuning of said coupling circuit whereby the impedance of an antenna is matched to that of an input line in such a manner that high selectivity is gained, back impedance holes are avoided, and maximum power transfer is achieved whereby a single antenna may be utilized for usage with a plurality of transmitters and receivers.

What is claimed as our invention is:

1. An antenna coupling system, comprising: an input line; a tunable series trap connected to said input line; resistance means connected in parallel with said series trap; tunable band pass selection means connected to said series trap; variable impedance matching elements connected to said band pass selection means; an output line connected to said matching elements; and control means for tuning said series trap and band pass selection means and varying said impedance matching elements whereby the impedance of said output line is matched to that of said input line by said impedance matching elements and whereby high selectivity is attained by said tunable series trap and band pass selection means to maximize power transfer only at desired operating frequencies with, high attenuation and impedance being afforded in both the forward and backward directions at all frequencies of other than at said desired operating frequencies.

2. An antenna coupling system, comprising: an input line connected to a tunable source to be tuned to a preselected operating frequency; an output line connected to a common antenna; a tunable series trap connected to said input line; resistance means connected in parallel with said series trap; a parallel tuned circuit connected to said series trap; variable impedance matching elements connected to said parallel tuned circuit; means connecting said impedance matching elements to said output line; and control means for tuning said series trap and parallel tuned circuit and then varying said impedance matching elements whereby the impedance of said output line is matched to that of said input line and whereby high selectivity is attained by said series trap and said parallel tuned circuit to maximize power transfer at said preselected operating frequency and preclude operational interference to and by other tunable sources connected to said common antenna.

3. An antenna coupling system, comprising: an input line; an output line; a coupling circuit connecting said input line to said output line, said coupling circuit including a tunable series trap, a resistor connected in parallel with said series trap, a tunable pass band selector, and variable shunt and series connected capacitive reactance elements; a first phasing discriminator connected to said input line for sensing phase deviations between voltage and current; a loading discriminator connected to said input line for sensing loading deviations between actual and a desired loading impedance; a second phasing discriminator connected to the input to said pass band selector for sensing phase deviations between voltage and current; said discriminators providing error voltages when said deviations occur; and control means connected to receive said error voltages and in response to an error voltage from said first phasing discriminator tuning said series trap, in response to an error voltage from said second phasing discriminator tuning said band selector, in response to an error voltage from said first phasing discriminator after said series trap has been tuned tuning said shunt connected capacitive reactance element, and in response to error voltage from said loading discriminator tuning said series connected capacitive reactance means whereby the impedance of said output line is matched to that of said input line and high selectivity at a preselected operating frequency is achieved as well as impedance and attenuation holes precluded off of said preselected operating frequency.

4. The antenna coupling system of claim 3 wherein said coupling circuit also includes first switching means between said series trap and said pass band selector and second switching means connected in series with said resistor; and wherein said control means includes means for controlling the actuation of said first and second switching means whereby said series trap is disconnected from said pass band selector and said resistor is disconnected from the parallel connection with said series trap while said series trap is being tuned.

5. The antenna coupling system of claim 3 wherein said pass band selector is a double tuned tank circuit having a variable position input link coil to provide a link coupled input to said tank circuit, said link coil being connectable to the output of said series trap; and wherein said control circuit includes means for determining optimum coupling and in response thereto causing said link coil to be varied until optimum coupling is realized after said series trap is tuned.

6. The antenna coupling system of claim 3 wherein said coupling system includes a dummy resistive load; and wherein said output line is connected to said coupling circuit by means of a two position switch in one position of which said output line is connected to said coupling circuit and in the other position of which said coupling circuit is connected to said dummy resistance load; and wherein said control circuit includes means for actuating said two position switch to remove said output line from said coupling circuit at least while said series trap and said pass band selector are being tuned.

7. An antenna coupling system for matching the impedance of an output line to that of an input line, providing high selectivity and precluding impedance and attenuation holes, said system comprising: an input line, a series trap connected to said input line; a resistor; first switch means in one position of which said resistor is connected in parallel with said series trap and in a second position of which said resistor is connected in series to ground with said series trap; lead mean; second switch means in one position of which said series trap is connected to said lead means and in a second position of which said series trap is disconnected from said lead means; a parallel tuned circuit having an adjustable link winding for input link coupling, said link winding being connected to said lead means; a variable shunt capacitor connected to the output of said parallel turned circuit; a variable series capacitor also connected to the output of said parallel tuned circuit; a dummy load; an output line; third switch means in one position of which said series capacitor is connected to said dummy load and in a second position of which said series capacitor is connected to said output line; a first phasing discriminator connected to said input line and producing a D.C. error voltage output when a phasing deviation exists between voltage and current; a loading discriminator connected to said input line and producing D.C. error voltage output when a deviation occurs between actual and a desired loading impedance; a second phasing discriminator connected to said lead means and producing a D.C. error voltage output when a phasing deivation exists between voltage and current; a servo gain and compensation circuit for receiving said error voltages and converting the same to A.C. voltages; and control means for receiving the output A.C. voltages from said servo gain and compensation network and in response thereto causing said series trap to be tuned to resonance at a preselected frequency with said first and second switches in said second position, causing said link coupling to be optimized, causing said parallel tuned circuit to be tuned to resonance at said preselected frequency with said first, second and third switches connected in said one position, and causing said shunt capacitor and series capacitors to be varied until said error voltages are reduced to zero.

8. An antenna coupling system, comprising: an input line; an output line; a coupling circuit that includes a series trap connected to said input line, a resistor, a parallel tuned tank circuit having a link input winding, a lead connected to said link input winding, a switching means in one position of which said resistor is connected in parallel with said series trap and said series trap is connected to said lead and in the other position of which said resistor is connected in series with said series trap to ground and disconnected from said lead, series and shunt connected capacitive means, and means connecting said series connected capacitive means to said output line; first and second phasing discriminators connected to said input line and said lead, respectively, for sensing phasing deviations between voltage and current and in response thereto producing an error voltage output; a loading discriminator connected to said input line and sensing loading deviations between actual and a desired loading impedance and in response thereto producing an error voltage output; and control means having a plurality of programming switches in a first position of which said first switching means is caused to assume said other position and said first phasing discriminator is caused to tune said series trap to resonance at a preselected operating frequency while said link coil is caused to be moved to obtain optimum link coupling at said preselected operating frequency, in a second position of which said first switching means is caused to assume said first position and said parallel tuned circuit is caused to be tuned to resonance by said second phasing discriminator at said preselected operating frequency, and in a third position of which said shunt capacitive means is caused to be varied in response to phasing error from said first phasing discriminator and said series capacitive means is caused to be varied in response to loading error from said loading discriminator until all error voltages are reduced to zero whereby said coupling circuit matches the impedance of said output line to that of said input line and provides high selectivity while precluding attenuation and impedance holes off said preselected operating frequency.

9. The antenna coupling system of claim 8 further characterized by a dummy load and second switching means in one position of which said dummy load is connected to said series connected capacitive means and in the other position of which said output line is connected to said series connected capacitive means, and wherein for intended use with a receiver to be connected to said input line said second switching means is caused to assume said first position by said control means while said programming switches are in said first, second and third positions and actuated to said other position only after said error voltages have been reduced to zero.

10. The antenna coupling system of claim 8 further characterized by a dummy load and second switching means in one position of which said dummy load is connected to said series connected capacitive means and in the other position of which said output line is connected to said series connected capacitive means, and wherein for intended use with a transmitter to be connected to said input line said second switching means is caused to assume said first position by said control means while said programming switches are in said first and second positions and caused to assume said other position when said programming switches are in said third position.

References Cited in the file of this patent

UNITED STATES PATENTS

| | | |
|---|---|---|
| 2,745,067 | True et al. | May 8, 1956 |
| 2,886,752 | De Long | May 12, 1959 |
| 2,921,273 | Broadhead et al. | Jan. 12, 1960 |